US012711921B2

(12) United States Patent
Lim et al.

(10) Patent No.: US 12,711,921 B2
(45) Date of Patent: Aug. 18, 2026

(54) DISPLAY DEVICE AND ELECTRONIC DEVICE HAVING THE SAME

(71) Applicant: SAMSUNG DISPLAY CO., LTD., Yongin-si (KR)

(72) Inventors: Seo Young Lim, Yongin-si (KR); Hyang A Park, Yongin-si (KR); Go Een Jeong, Yongin-si (KR); Soo Yeong Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/293,024

(22) Filed: Aug. 7, 2025

(65) Prior Publication Data

US 2026/0112314 A1 Apr. 23, 2026

(30) Foreign Application Priority Data

Oct. 22, 2024 (KR) ........................ 10-2024-0144875

(51) Int. Cl.
*G09G 3/3233* (2016.01)

(52) U.S. Cl.
CPC ... *G09G 3/3233* (2013.01); *G09G 2300/0819* (2013.01); *G09G 2340/0457* (2013.01); *G09G 2360/148* (2013.01)

(58) Field of Classification Search
CPC ......... G09G 3/3233; G09G 2300/0819; G09G 2340/0457; G09G 2360/148
See application file for complete search history.

(56) References Cited

U.S. PATENT DOCUMENTS

| | | | | |
|---|---|---|---|---|
| 2023/0069681 A1* | 3/2023 | Jo | G09G 3/3241 |
| 2023/0089207 A1* | 3/2023 | Lee | G09G 3/32 345/211 |
| 2023/0103841 A1* | 4/2023 | Park | G09G 3/3233 345/211 |
| 2023/0360427 A1* | 11/2023 | Kim | G09G 3/3233 |
| 2023/0397885 A1* | 12/2023 | Kim | G06F 3/0416 |
| 2023/0402014 A1* | 12/2023 | Kim | G09G 3/3233 |
| 2025/0046116 A1* | 2/2025 | Kim | G06V 40/1318 |
| 2025/0107346 A1* | 3/2025 | Jin | H10K 39/34 |

(Continued)

FOREIGN PATENT DOCUMENTS

| | | |
|---|---|---|
| CN | 114093917 A | 2/2022 |
| KR | 10-1142592 B1 | 5/2012 |

(Continued)

*Primary Examiner* — Rodney Amadiz
(74) *Attorney, Agent, or Firm* — F. CHAU & ASSOCIATES, LLC

(57) ABSTRACT

A display device includes a pixel and a sensor. The sensor includes a light-receiving element and a first sensor transistor. A second sensor transistor is connected between a reset power line and a gate electrode of the first sensor transistor, and includes a gate electrode connected to a reset control line. A third sensor transistor is connected between the first sensor transistor and a readout line, and includes a gate electrode connected to a first scan line. A fourth sensor transistor is connected between the gate electrode of the first sensor transistor and an anode electrode of the light-receiving element, and includes a gate electrode connected to a gate line. The first scan line and the gate line are connected to each other.

20 Claims, 17 Drawing Sheets

(56) References Cited

U.S. PATENT DOCUMENTS

| | | | | |
|---|---|---|---|---|
| 2025/0143122 | A1* | 5/2025 | Lee | H10K 59/65 |
| 2025/0322688 | A1* | 10/2025 | Kim | G06F 3/042 |

FOREIGN PATENT DOCUMENTS

| | | | |
|---|---|---|---|
| KR | 10-2022-0099540 | A | 7/2022 |
| WO | 2006119333 | A1 | 11/2006 |
| WO | 2021090105 | A1 | 5/2021 |

* cited by examiner

ACT: ACT1, ACT2
GAT1: BR_Ei, BRP1, CE1, S1i, S3i, PL2
GAT2: BR_PL4, CE2, RSTL, S2i, S4i
OCT: ACT3, ACT4
GAT3: A_S2i, A_S4i, BR_RSTL, BRP2, TGL, PL5, Ei

SD1: BRP3~BRP9, PL1, PL3, PL4
SD2: BRP11~BRP15, PL1, PL4a
SD3: BRP21, BRP22, Dj, PL2, PL2a, PL4b, RXk

ACT: ACT1, ACT2
GAT1: CE1, S1i, BML
GAT2: CE2, S2i
OCT: ACT3, ACT4
GAT3: A_S2i, BRP2, TGL
SD1: BRP3, BRP5, BRP6, BRP8, BRP9
SD2: BRP13~BRP15
SD3: BRP21, BRP22, Dj, RXk

CD, EML, PEL } LED

CD, LRL, SEL } LRD

ACT: ACT1, ACT2
GAT1: CE1, S1i, BML
GAT2: CE2, S2i
OCT: ACT3, ACT4
GAT3: A_S2i, BRP2, TGL
SD1: BRP3, BRP5, BRP6, BRP8, BRP9, BRP_C
SD2: BRP13~BRP15, TGL_C
SD3: BRP21, BRP22, Dj, RXk

CD, EML, PEL } LED

CD, LRL, SEL } LRD

ACT: ACT1, ACT2
GAT1: BR_Ei, BRP1, CE1, S1i, S3i, PL2
GAT2: BR_PL4, CE2, RSTL, S2i, S4i
OCT: ACT3, ACT4
GAT3: A_S2i, A_S4i, BR_RSTL, BRP2, TGL_1, PL5, Ei

DISPLAY DEVICE AND ELECTRONIC DEVICE HAVING THE SAME

CROSS-REFERENCE TO RELATED APPLICATIONS

The application claims priority under 35 U.S.C. § 119 to Korean Patent Application No. 10-2024-0144875, filed on Oct. 22, 2024, the disclosure of which is incorporated by reference herein in its entirety.

TECHNICAL FIELD

Embodiments of the present disclosure generally relate to a display device and an electronic device having the same, and more particularly, to a display device having a photo-sensor and an electronic device having the display device.

DISCUSSION OF RELATED ART

With advancements in information technology, display devices, which serve as an interface between users and information, have become increasingly important. Accordingly, various types of display devices, such as liquid crystal display (LCD) devices and organic light-emitting display (OLED) devices, are being widely adopted. Additionally, some display devices incorporate photosensors to detect a user's fingerprint and perform user authentication.

SUMMARY

Embodiments of the present disclosure provide a display device and an electronic device having improved resolution and sensing performance.

According to an embodiment of the present disclosure a display device includes a pixel including a light-emitting element, and a sensor. The sensor includes a light-receiving element, a first sensor transistor, a second sensor transistor connected between a reset power line and a gate electrode of the first sensor transistor, in which the second sensor transistor includes a gate electrode connected to a reset control line, a third sensor transistor connected between the first sensor transistor and a readout line, in which the third sensor transistor includes a gate electrode connected to a first scan line, and a fourth sensor transistor connected between the gate electrode of the first sensor transistor and an anode electrode of the light-receiving element, in which the fourth sensor transistor includes a gate electrode connected to a gate line. The first scan line and the gate line are connected to each other.

In an embodiment, the third sensor transistor is a p-type transistor, and the fourth sensor transistor is an n-type transistor.

In an embodiment, the third sensor transistor includes a silicon semiconductor, and the fourth sensor transistor includes an oxide semiconductor.

In an embodiment, the first sensor transistor is a p-type transistor, and the second sensor transistor is an n-type transistor.

In an embodiment, the pixel further includes a first transistor that provides a driving current to the light-emitting element, and a second transistor connected between a first electrode of the first transistor and a data line. A gate electrode of the second transistor is connected to the first scan line.

In an embodiment, the display device further includes a driving circuit. The driving circuit provides a reset signal having a logic high level to the reset control line at a first time point, provides a first scan signal having a logic low level to the first scan line and the gate line at a second time point, provides a gate signal to the first scan line and the gate line at a third time point, wherein the gate signal has the logic high level at the third time point, and provides the gate signal to the first scan line and the gate line at a fourth time point, wherein the gate signal has the logic low level at the fourth time point. The first to fourth time points sequentially occur in a sensing cycle.

In an embodiment, the driving circuit reads a first sensing signal through the readout line at the second time point, reads a second sensing signal through the readout line at the fourth time point, and performs a subtraction operation on the first sensing signal and the second sensing signal.

In an embodiment, the display device further includes a plurality of sensors including the sensor. The driving circuit commonly provides the reset signal to the plurality of sensors, and sequentially provides the first scan signal to the plurality of sensors in units of horizontal lines.

In an embodiment, exposure times for the respective plurality of sensors between the third time point and the fourth time point are constant.

In an embodiment, in a plan view, a semiconductor layer of the second sensor transistor and a semiconductor layer of the fourth sensor transistor substantially extend in a second direction. In the plan view, the first scan line and the gate line substantially extend in a first direction crossing the second direction.

In an embodiment, in the plan view, the first scan line includes a protruding portion that overlaps the semiconductor layer of the fourth sensor transistor. In the plan view, the gate line overlaps the protruding portion of the first scan line.

In an embodiment, in a cross-sectional view, the semiconductor layer of the fourth sensor transistor is disposed between the first scan line and the gate line. In the cross-sectional view, the gate line is in contact with the first scan line through a contact hole.

According to an embodiment of the present disclosure, a display device includes a pixel including a light-emitting element, and a sensor. The sensor includes a light-receiving element, a first sensor transistor, a second sensor transistor connected between a reset power line and a gate electrode of the first sensor transistor, in which the second sensor transistor includes a gate electrode connected to a reset control line, a third sensor transistor connected between the first sensor transistor and a readout line, in which the third sensor transistor includes a gate electrode connected to a first scan line, and a fourth sensor transistor connected between the gate electrode of the first sensor transistor and an anode electrode of the light-receiving element, in which the fourth sensor transistor includes a gate electrode connected to a gate line. A first scan signal provided to the first scan line and a gate signal provided to the gate line have a same waveform.

In an embodiment, the third sensor transistor is a p-type transistor, and the fourth sensor transistor is an n-type transistor.

In an embodiment, the third sensor transistor includes a silicon semiconductor, and the fourth sensor transistor includes an oxide semiconductor.

In an embodiment, the pixel further includes a first transistor that provides a driving current to the light-emitting element, and a second transistor connected between a first electrode of the first transistor and a data line. A gate electrode of the second transistor is connected to the first scan line.

In an embodiment, the display device further includes a driving circuit. The driving circuit provides a reset signal having a logic high level to the reset control line at a first time point, provides the first scan signal to the first scan line and the gate line at a second time point, wherein the first scan signal has a logic low level at the second time point, provides the gate signal to the first scan line and the gate line at a third time point, wherein the gate signal has the logic high level at the third time point, and provides the gate signal to the first scan line and the gate line at a fourth time point, wherein the gate signal has the logic low level at the fourth time point. The first to fourth time points sequentially occur in a sensing cycle.

In an embodiment, in a plan view, a semiconductor layer of the second sensor transistor and a semiconductor layer of the fourth sensor transistor extend in a second direction. In the plan view, the first scan line and the gate line extend while crossing the pixel in a first direction crossing the second direction.

In an embodiment, in the plan view, the gate line overlaps the first scan line.

According to an embodiment of the present disclosure, an electronic device includes a display device configured to display an image, based on input image data, and a processor configured to provide the input image data to the display device. The display device includes a pixel including a light-emitting element, and a sensor. The sensor includes a light-receiving element, a first sensor transistor, a second sensor transistor connected between a reset power line and a gate electrode of the first sensor transistor, in which the second sensor transistor includes a gate electrode connected to a reset control line, a third sensor transistor connected between the first sensor transistor and a readout line, in which the third sensor transistor includes a gate electrode connected to a first scan line, and a fourth sensor transistor connected between the gate electrode of the first sensor transistor and an anode electrode of the light-receiving element, in which the fourth sensor transistor includes a gate electrode connected to a gate line. The first scan line and the gate line are connected to each other.

BRIEF DESCRIPTION OF THE DRAWINGS

The above and other features of the present disclosure will become more apparent by describing in detail embodiments thereof with reference to the accompanying drawings.

DETAILED DESCRIPTION

Figure 1:
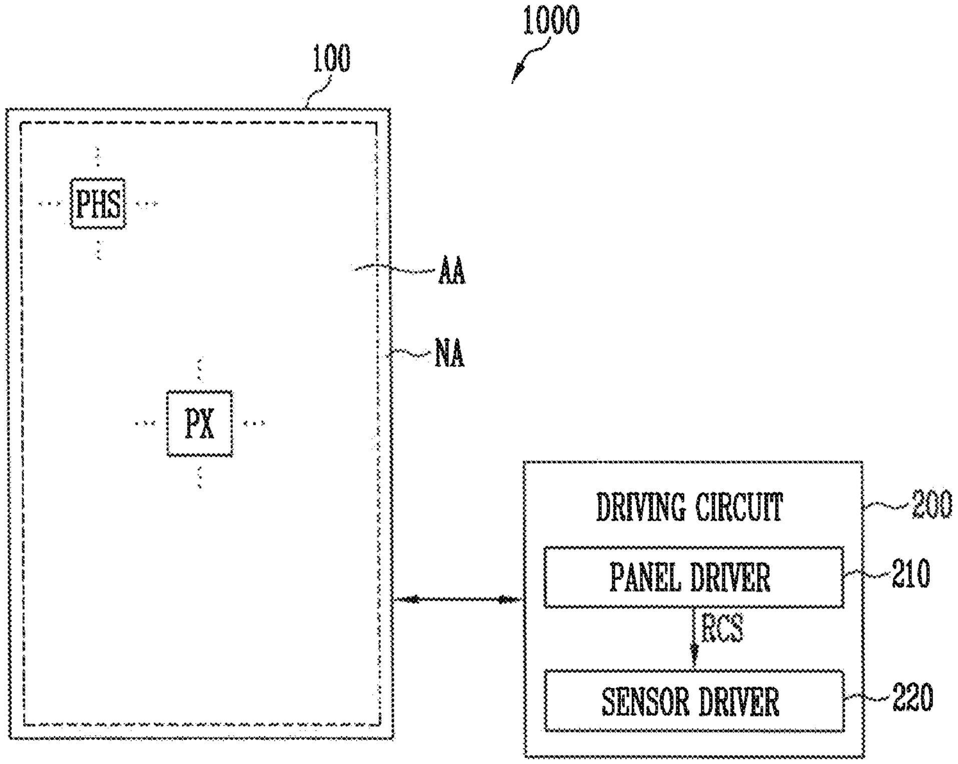
FIG. 1 is a block diagram illustrating a display device according to embodiments of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "connection" between two components may include both electrical connection and/or physical connection.

It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art, for example, within ±30%, 20%, 10% or 5% of the stated value. Further, it is to be understood that while parameters may be described herein as having "about" a certain value, according to embodiments, the parameter may be exactly the certain value or approximately the certain value within a measurement error as would be understood by a person having ordinary skill in the art. Similarly, when a component is described as extending substantially in a direction, the component extends exactly in that direction, or extends approximately in that direction within a measurement error as would be understood by a person having ordinary skill in the art. Other uses of these terms and similar terms to describe the relationships between components should be interpreted in a like fashion.

Embodiments of the present disclosure provide a display device with an integrated sensor circuit that may improve layout efficiency, reduce parasitic interference, and enhance resolution. For example, embodiments of the present disclosure address the issue of excessive circuit area and coupling noise in conventional designs by introducing an improved transistor arrangement in which multiple transistors, such as, for example, third and fourth sensor transistors of the sensor and a second transistor of a pixel (described in further detail below), share a common first scan line (also described in further detail below). By utilizing this shared scan line architecture, embodiments of the present disclosure may eliminate the need for separate control signals for the individual transistors, which in turn may simplify the circuit structure, reduce the number of required signal lines, and decrease the overall area occupied by the pixel and sensor circuits. Thus, embodiments of the present disclosure may provide a more compact circuit layout and also improve display resolution by allowing more sensing and display elements to be integrated within the same space.

Embodiments of the present disclosure may reduce parasitic coupling and signal interference that could arise when different circuit components overlap. In conventional configurations, overlapping conductive elements such as gate lines and scan lines may introduce unwanted capacitive coupling, which can distort signal transmission and degrade sensing performance. However, according to embodiments of the present disclosure, this issue may be mitigated by providing a gate signal and a scan signal that share the same waveform and phase, which may prevent or reduce substantial interference even when conductive elements overlap. As a result, the circuit according to embodiments of the present disclosure can maintain stable electrical characteristics without requiring additional shielding layers or complex compensation techniques, further contributing to space efficiency.

Embodiments of the present disclosure may provide a high-resolution display with improved sensing capabilities while also improving circuit layout and minimizing or reducing interference. By implementing a shared scan line approach and efficiently managing signal synchronization, embodiments of the present disclosure may achieve a balance between reducing circuit area, enhancing resolution, and improving signal integrity.

Hereinafter, a display device according to an embodiment of the disclosure will be described with reference to the accompanying drawings.

FIG. 1 is a block diagram illustrating a display device according to embodiments of the present disclosure.

Referring to FIG. 1, a display device 1000 may include a display panel 100 and a driving circuit 200 (or driver). In an embodiment, the driving circuit 200 may include a panel driver 210 and a sensor driver 220.

The display device 1000 may be implemented as a self-luminous display device including a plurality of self-luminous elements. For example, the display device 1000 may be an organic light-emitting display device including an organic light-emitting element. However, this is merely illustrative, and the display device 1000 may be implemented as a display device including an inorganic light-emitting element, a display device including light-emitting elements made of a combination of an inorganic material and an organic material, a display device which displays an image, using a quantum dot, or the like.

The display device 1000 may be, for example, a flat panel display device, a flexible display device, a curved display device, a foldable display device, a bendable display device, or a rollable display device. The display device 1000 may be applied to, for example, a transparent display device, a head-mounted display device, a wearable display device, and the like.

The display panel 100 may include a display area AA and a non-display area NA. The display area AA may be an area in which at least one pixel PX is provided. The pixel PX may be referred to as a sub-pixel or a light-emitting pixel. The pixel PX may include at least one light-emitting element (e.g., a light-emitting diode). For example, the light-emitting element may include a light-emitting layer (e.g., an organic light-emitting layer). A portion at which light is emitted by the light-emitting element may be defined as a light-emitting area. The display device 1000 may drive the pixel PX, thereby displaying an image in the display area AA.

The non-display area NA may be an area provided at the periphery of the display area AA. In an embodiment, the non-display area NA may inclusively mean the other area except the display area AA on the display panel 100. For example, the non-display area NA may include a line area, a pad area, various dummy areas, and the like.

In an embodiment, at least one photosensor PHS may be included in the display area AA. The photosensor PHS may be referred to as a sensor pixel. The photosensor PHS may include a light-receiving element including a light-receiving layer. The light-receiving layer of the light-receiving element and the light-emitting layer of the light-emitting element may be in a same layer in the display area AA, and the light-receiving layer may be spaced apart from the light-emitting element on a plane (e.g., in a plan view).

In an embodiment, a plurality of photosensors PHS may be distributed while being spaced apart from each other throughout the entire area of the display area AA. However, this is merely illustrative. Only a portion of the display area AA may be set as a selectable sensing area, and photosensors PHS may be provided in the corresponding sensing area. In addition, the photosensor PHS may be included in at least a portion of the non-display area NA.

In an embodiment, the photosensor PHS may sense that light output from a light source (e.g., the light-emitting element of the pixel PX) is reflected by an external object (e.g., a finger of a user, or the like). For example, a fingerprint of the user may be sensed through the photosensor PHS. Hereinafter, a case where the photosensor PHS is used for fingerprint sensing will be described as an example. However, in various embodiments, the photosensor PHS may sense various biometric information such as an iris and a vein.

The driving circuit 200 may include the panel driver 210 and the sensor driver 220. The display device 1000 may include the panel driver 210 and the sensor driver 220. For example, the panel driver 210 and the sensor driver 220 may be implemented as integrated circuits independent from each other, or the driving circuit 200 may be implemented as one integrated circuit. For example, at least a portion of the sensor driver 220 may be included in the panel driver 210, or operate in connection with the panel driver 210.

The panel driver 210 may scan the pixel PX of the display area AA, and supply, to the pixel PX, a data signal corresponding to image data (or an image). The display panel 100 may display an image corresponding to the data signal.

In an embodiment, the panel driver 210 may supply a driving signal for photo sensing (e.g., fingerprint sensing) to the pixel PX. The driving signal may be provided to allow the pixel PX to emit light, thereby operating as a light source for the photosensor PHS. In an embodiment, the panel driver 210 may supply the driving signal for photo sensing and/or another driving signal to the photosensor PHS. However, this is merely illustrative, and driving signals for photo sensing may be provided by the sensor driver 220.

The sensor driver 220 may detect biometric information such as fingerprint information corresponding to a finger of the user, based on a sensing signal received from the photosensor PHS. In an embodiment, the sensor driver 220 may supply the driving signals to the photosensor PHS and/or the pixel PX.

In an embodiment, the panel driver 210 may provide a readout control signal RCS to the sensor driver 220, and the sensor driver 220 may read out (or sample) a sensing signal in connection with the panel driver 210, based on the readout control signal RCS. For example, the sensor driver 220 may read out or sample the sensing signal in at least one pixel row (or horizontal line) unit in response to the readout control signal RCS.

Figure 2:
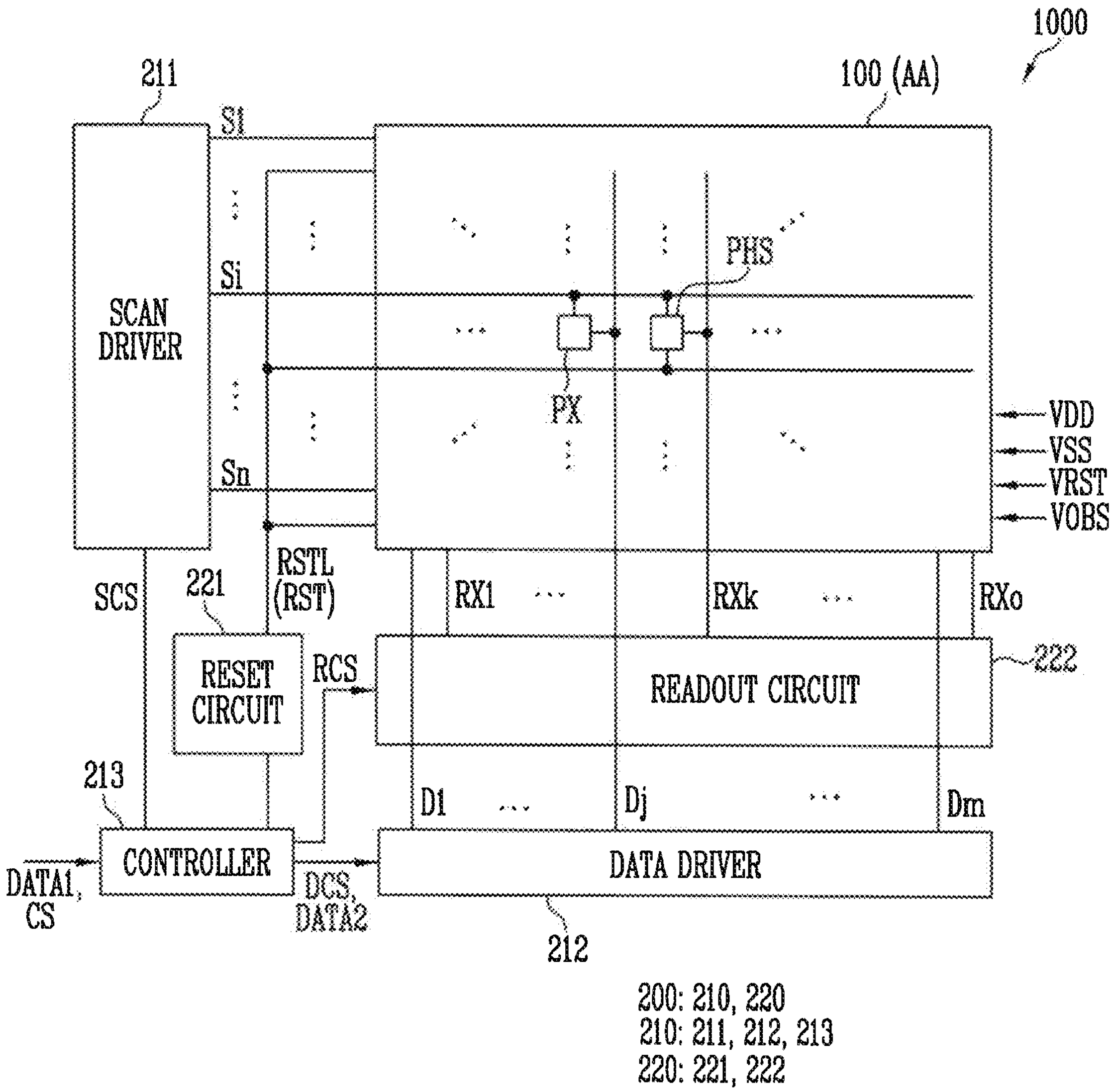
FIG. 2 is a block diagram illustrating an embodiment of the display device shown in FIG. 1.

FIG. 2 is a block diagram illustrating an embodiment of the display device shown in FIG. 1.

Referring to FIGS. 1 and 2, a display panel 100 may include signal lines, at least one pixel PX, and at least on photosensor PHS. The signal lines may include scan lines S1 to Sn, data lines D1 to Dm, readout lines RX1 to RXo, and a reset control line RSTL (or reset line). Here, n, m, and o may be positive integers, respectively.

The pixels PX may be arranged or disposed in areas (e.g., pixel areas) partitioned by the scan lines S1 to Sn and the data lines D1 to Dm. The photosensors PHS may be arranged or disposed in areas partitioned by the scan lines S1 to Sn and the readout lines RX1 to RXo. The pixels PX and the photosensors PHS may be arranged in a two-dimensional array in a display area AA of the display panel 100, but the disclosure is not limited thereto.

The pixel PX may be electrically connected (or coupled) to at least one of the scan lines S1 to Sn and one of the data lines D1 to Dm. The photosensor PHS may be electrically connected to one of the scan lines S1 to Sn, one of the readout lines RX1 to RXo, and the reset control line RSTL. A connection configuration among the pixel PX, the photosensor PHS, and the signal lines will be described further below with reference to FIG. 5.

Power voltages VDD, VSS, VRST, and VOBS necessary for driving of the pixel PX and the photosensor PHS may be provided to the display panel 100. The power voltages VDD, VSS, VRST, and VOBS may be supplied from a power supply. The power supply may be implemented as a Power Management IC (PMIC).

A driving circuit 200 may include a scan driver 211 (or gate driver), a data driver 212 (or source driver), a controller 213, (timing controller, or second processor), a reset circuit 221 (or reset unit), and a readout circuit 222 (or readout unit). For example, the scan driver 211, the data driver 212, and the controller 213 may be included in a panel driver 210, and the reset circuit 221 and the readout circuit 222 may be included in a sensor driver 220. However, the disclosure is not limited thereto. For example, the reset circuit 221 may be included in the panel driver 210 (or the controller 213).

The scan driver 211 may be electrically connected to the pixels PX and the photosensors PHS through the scan lines S1 to Sn. The scan driver 211 may generate scan signals, based on a scan control signal SCS (or gate control signal), and sequentially provide the scan signals to the scan lines S1 to Sn. The scan control signal SCS may include a start signal, clock signals, and the like, and be provided from the controller 213 to the scan driver 211. For example, the scan driver 211 may be implemented as a shift register which generates and outputs scan signals by sequentially shifting the start signal in a pulse form, using the clock signals. That is, the scan driver 211 may selectively drive the pixels PX and the photosensors PHS while scanning the display panel 100.

The scan driver 211 may be formed together with the pixels PX of the display panel 100. However, the scan driver 211 is not limited thereto. For example, the scan driver 211 may be implemented as an integrated circuit.

A pixel PX selectively driven by the scan driver 211 may emit light with a luminance corresponding to a data signal provided to a data line. A photosensor PHS selectively driven by the scan driver 211 may output, to a readout line, an electrical signal (e.g., a sensing signal, e.g., a current/voltage) corresponding to sensed light. For example, a pixel PX selectively driven through an ith scan line Si may emit light with a luminance corresponding to a data signal provided to a jth data line Dj (i and j are positive integers, respectively). For example, a photosensor PHS selectively driven through the ith scan line Si may output, to a kth readout line RXk, an electrical signal corresponding to sensed light (k is a positive integer).

The data driver 212 may generate a data signal (or data voltage), based on image data DATA2 and a data control signal DCS, which are provided from the controller 213, and supply the data signal to the display panel 100 (or the pixels PX) through the data lines D1 to Dm. The data control signal DCS may be a signal for controlling an operation of the data driver 212, and include a data enable signal (or load signal) instructing an output of a valid data signal, a horizontal start signal, a data clock signal, and the like. For example, the data driver 212 may include a shift register which generates a sampling signal by shifting the horizontal start signal in synchronization with the data clock signal, a latch which latches the image data DATA2 in response to the sampling signal, a digital-to-analog converter (or decoder) which converts the latched image data (e.g., data in a digital form) into a data signal in an analog form, and a buffer (or amplifier) which outputs the data signal to a corresponding data line (e.g., the jth data line Dj).

The controller 213 may receive input image data DATA1 and a control signal CS from an external device (e.g., a graphic processor, an application processor, or a first processor), generate the scan control signal SCS and the data control signal DCS, based on the control signal CS, and generate the image data DATA2 by converting the input image data DATA1. The control signal CS may include, for example, a vertical synchronization signal, a horizontal synchronization signal, a reference clock signal, and the like. The vertical synchronization signal may represent a start of frame data (e.g., data corresponding to a frame period in which a frame image is displayed), and the horizontal synchronization signal may represent a start of a data row (e.g., a data row among a plurality of data rows included in frame data). The controller 213 may convert the input image data DATA1 into the image data DATA2 having a format corresponding to a pixel arrangement in the display panel 100.

The controller 213 may generate a reset control signal and a readout control signal RCS, based on the control signal CS.

The reset circuit 221 may be connected to the photosensors PHS provided in the display panel 100 through the reset control line RSTL. For example, the reset circuit 221 may be commonly connected to all the photosensors PHS provided in the display panel 100 through a reset control line RSTL. The reset circuit 221 may simultaneously provide a reset signal (or reset control signal) to all the photosensors PHS in response to the reset control signal. The reset signal may be a control signal for providing a reset voltage VRST. The reset signal is simultaneously provided to all the photosensors PHS, and hence the reset signal may be referred to as a global reset signal. However, the reset circuit 221 is not limited thereto. For example, the reset circuit 221 may be implemented similarly to the scan driver 211, to sequentially provide the reset signal to the photosensors PHS.

The readout circuit 222 may receive a sensing signal from the photosensor PHS through the readout lines RX1 to RXo, and perform signal processing on the sensing signal. For example, the readout circuit 222 may convert the sensing signal in an analog form into a signal (or digital value) in a digital form.

Read-out sensing signals may be provided as one sensing data (or biometric information) to an external device (e.g., an application processor), and biometric authentication (e.g., fingerprint authentication) may be performed based on the sensing data. For example, the read-out sensing signals may be provided to the controller 213, and biometric authentication may be performed in the controller 213.

Figure 3:
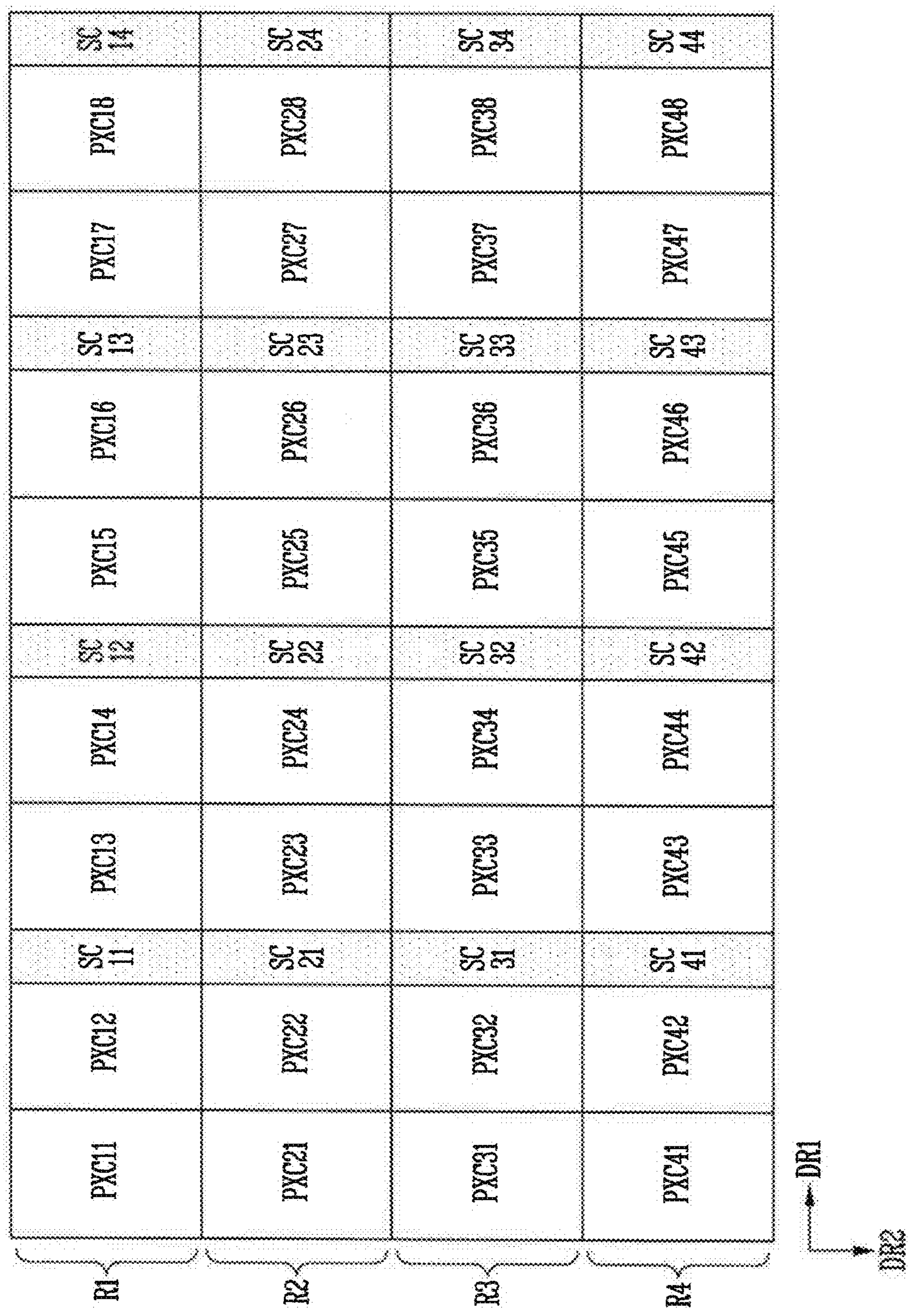
FIG. 3 is a diagram illustrating an example of an arrangement of backplane circuits of a display area of a display panel included in the display device shown in FIG. 2.
Figure 4:
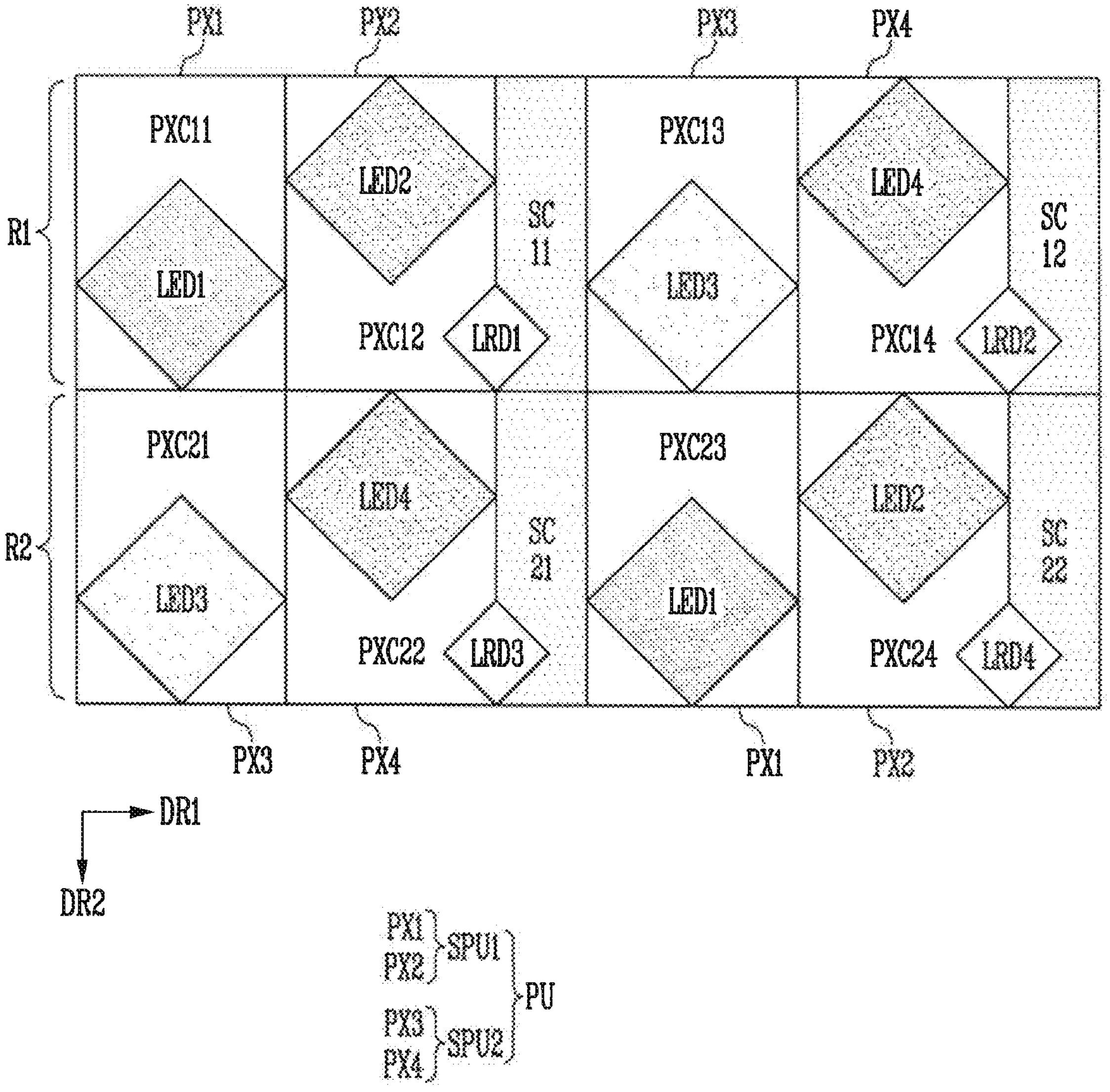
FIG. 4 is a diagram illustrating an example of the display area of the display panel included in the display device shown in FIG. 2.

FIG. 3 is a diagram illustrating an example of an arrangement of backplane circuits of the display area of the display panel included in the display device shown in FIG. 2. FIG. 4 is a diagram illustrating an example of the display area of the display panel included in the display device shown in FIG. 2.

Referring to FIGS. 1 to 4, pixels PX1 to PX4 and a plurality of photosensors PHS may be arranged in the display area AA of the display panel 100.

The display area AA may be divided into pixel rows R1 to R4. Each of the pixel rows R1 to R4 may extend in a first direction DR1, and be arranged in a second direction DR2. Each of the pixel rows R1 to R4 may include pixels PX1 to PX4. Each of the pixels PX1 to PX4 may include one of pixel circuits PXC11 to PXC48 and one of light-emitting elements LED1 to LED4.

In an embodiment, a first pixel PX1, a second pixel PX2, and a third pixel PX3 may emit first color light, second color light, and third color light, respectively. The first color light, the second color light, and the third color light may be different color lights, and each of the first color light, the second color light, and the third color light may be light of one of red, green, and blue. In an embodiment, a fourth pixel PX4 and the second pixel PX2 may emit same color light. For example, a first light-emitting element LED1 may emit the first color light, a second light-emitting element LED2 and a fourth light-emitting element LED4 may emit the second color light, and a third light-emitting element LED3 may emit the third color light.

In FIG. 4, each of the light-emitting elements LED1 to LED4 may be understood as a light-emitting area corresponding to a light-emitting layer. However, this is for convenience of description, and the color of light emitted by each of the light-emitting elements LED1 to LED4, and the position, area, shape, and the like of each of the light-emitting elements LED1 to LED4 are not be limited thereto.

In an embodiment, pixels PX1 to PX4 may be arranged with respect to the first direction DR1 in an order of a first pixel PX1 emitting red light, a second pixel PX2 emitting green light, a third pixel PX3 emitting blue light, and a fourth pixel PX4 emitting green light on each of odd-numbered pixel rows including a first pixel row R1 (or first horizontal line) and a third pixel row R3 (or third horizontal line).

Pixels PX1 to PX4 may be arranged with respect to the first direction DR1 in an order of a third pixel PX3, a fourth pixel PX4, a first pixel PX1, and a second sub-pixel SPX2 on each of even-numbered pixel rows including a second pixel row R2 (or second horizontal line) and a fourth pixel row R4 (or fourth horizontal line).

In an embodiment, the first pixel PX1 and the second pixel PX2 may constitute a first sub-pixel unit SPU1, and the third pixel PX3 and the fourth pixel PX4 may constitute a second sub-pixel unit SPU2. Therefore, the first sub-pixel unit SPU1 and the second sub-pixel unit SPU2 may be alternately arranged on the odd-numbered pixel rows R1 and R3, and the second sub-pixel unit SPU2 and the first sub-pixel unit SPU1 may be alternately arranged on the even-numbered pixel rows R2 and R4 in a pattern opposite to the pattern in which the first sub-pixel unit SPU1 and the second sub-pixel unit SPU2 are alternately arranged on the odd-numbered pixel rows R1 and R3.

It may be understood that first and second sub-pixel units SPU1 and SPU2 adjacent to each other constitute a pixel unit PU. For example, FIG. 4 illustrates a pixel unit PU of each of the first pixel row R1 and the second pixel row R2. However, this is merely illustrative, and the arrangement of pixels is not limited thereto.

Pixel circuits PXC11 to PXC18 respectively corresponding to pixels PX1 to PX4 of the first pixel row R1 may be arranged in the first direction DR1 on the first pixel row R1. Pixel circuits PXC21 to PXC28 respectively corresponding to pixels PX1 to PX4 of the second pixel row R2 may be arranged in the first direction DR1 on the second pixel row R2. Similarly, pixel circuits PXC31 to PXC38 and PXC41 to PXC48 respectively corresponding to pixels PX1 to PX4 of the third and fourth pixel rows R3 and R4 may be arranged in the first direction DR1 on the third and fourth pixel rows R3 and R4.

In FIG. 3, first, second, third and fourth pixel circuits PXC11, PXC12, PXC13, and PXC14 of the first pixel row R1 may be included in a pixel unit PU, and fifth, sixth, seventh, and eighth pixel circuits PXC15, PXC16, PXC17, and PXC18 of the first pixel row R1 may be included in another pixel unit PU.

Similarly, first to fourth pixel circuits PXC21 to PXC24 of the second pixel row R2, fifth to eighth pixel circuits PXC25 to PXC28 of the second pixel row R2, first to fourth pixel circuits PXC31 to PXC34 of the third pixel row R3, fifth to eighth pixel circuits PXC35 to PXC38 of the third pixel row R3, first to fourth pixel circuits PXC41 to PXC44 of the fourth pixel row R4, and fifth to eighth pixel circuits PXC45 to PXC48 of the fourth pixel row R4 may also be included in different pixel units PU.

In an embodiment, each of the pixel rows R1 to R4 may include light-receiving elements LRD1 to LRD4. In FIG. 4, each of the light-receiving elements LRD1 to LRD4 may be understood as a light-receiving area corresponding to a light-receiving layer. However, this is merely for convenience of description, and the position, area, shape, and the like of each of the light-receiving elements LRD1 to LRD4 are not limited thereto.

Light-receiving elements LRD1 and LRD2 of the first pixel row R1 may overlap at least portions of the pixel circuits PXC11 to PXC14 of the first pixel row R1 and sensor circuits SC11 and SC12 of the first pixel row R1, respectively. Light-receiving elements LRD3 and LRD4 of the second pixel row R2 may overlap at least portions of the pixel circuits PXC21 to PXC24 of the second pixel row R2 and at least portions of sensor circuits SC21 and SC22 of the second pixel row R2, respectively.

In an embodiment, a first light-receiving element LRD1 may overlap at least a portion of a first sensor circuit SC11 of the first pixel row R1, and a third light-receiving element LRD3 may overlap at least a portion of a first sensor circuit SC21 of the second pixel row R2.

In addition, referring to FIGS. 2 and 3 together, a second light-receiving element LRD2 may overlap at least a portion of a second sensor circuit SC12 of the first pixel row R1, and a fourth light-receiving element LRD4 may overlap at least a portion of a second sensor circuit SC22 of the second pixel row R2.

The light-receiving elements LRD1 to LRD4 may be formed in an arrangement shown in FIG. 4 in the display area AA.

In an embodiment, sensor circuits SC11 to SC44 may be connected to corresponding light-receiving elements, respectively. For example, the first sensor circuit SC11 of the first pixel row R1 may be connected to the first light-receiving element LRD1, and the first sensor circuit SC11 and the first light-receiving element LRD1 may constitute a photosensor PHS. Similarly, the second sensor circuit SC12 of the first pixel row R1 may be connected to the second light-receiving element LRD2, and the second sensor circuit SC12 and the second light-receiving element LDR2, the first sensor circuit SC21 of the second pixel row R2 may be connected to the third light-receiving element LRD3, and the second sensor circuit SC22 of the second pixel row R2 may be connected to the fourth light-receiving element LRD4. However, the disclosure is not limited thereto. For example, only some of the sensor circuits SC11 to SC44 may be provided, and the some of the sensor circuits SC11 to SC44 may be connected to a plurality of light-receiving elements.

The first sensor circuit SC11 of the first pixel row R1 may be arranged between the first sub-pixel unit SPU1 and the second sub-pixel unit SPU2, which are included in the pixel unit PU. For example, the first and second pixel circuits PXC11 and PXC12 of the first pixel row R1 may be included in the first sub-pixel unit SPU1, and the third and fourth pixel circuits PXC13 and PXC14 of the first pixel row R1 may be included in the second sub-pixel unit SPU2. Therefore, at least two pixel circuits (e.g., PXC13 and PXC14) may be arranged between the first sensor circuit SC11 and the second sensor circuit SC12, which are adjacent to each other on the first row pixel R1.

Like the first sensor circuit SC11 of the first pixel row R1, the second sensor circuit SC12 of the first pixel row, the first sensor circuit SC21 of the second pixel row R2, and the second sensor circuit SC22 of the second pixel row R2 may be arranged between the first sub-pixel unit SPU1 and the second sub-pixel unit SPU2.

Figure 5:
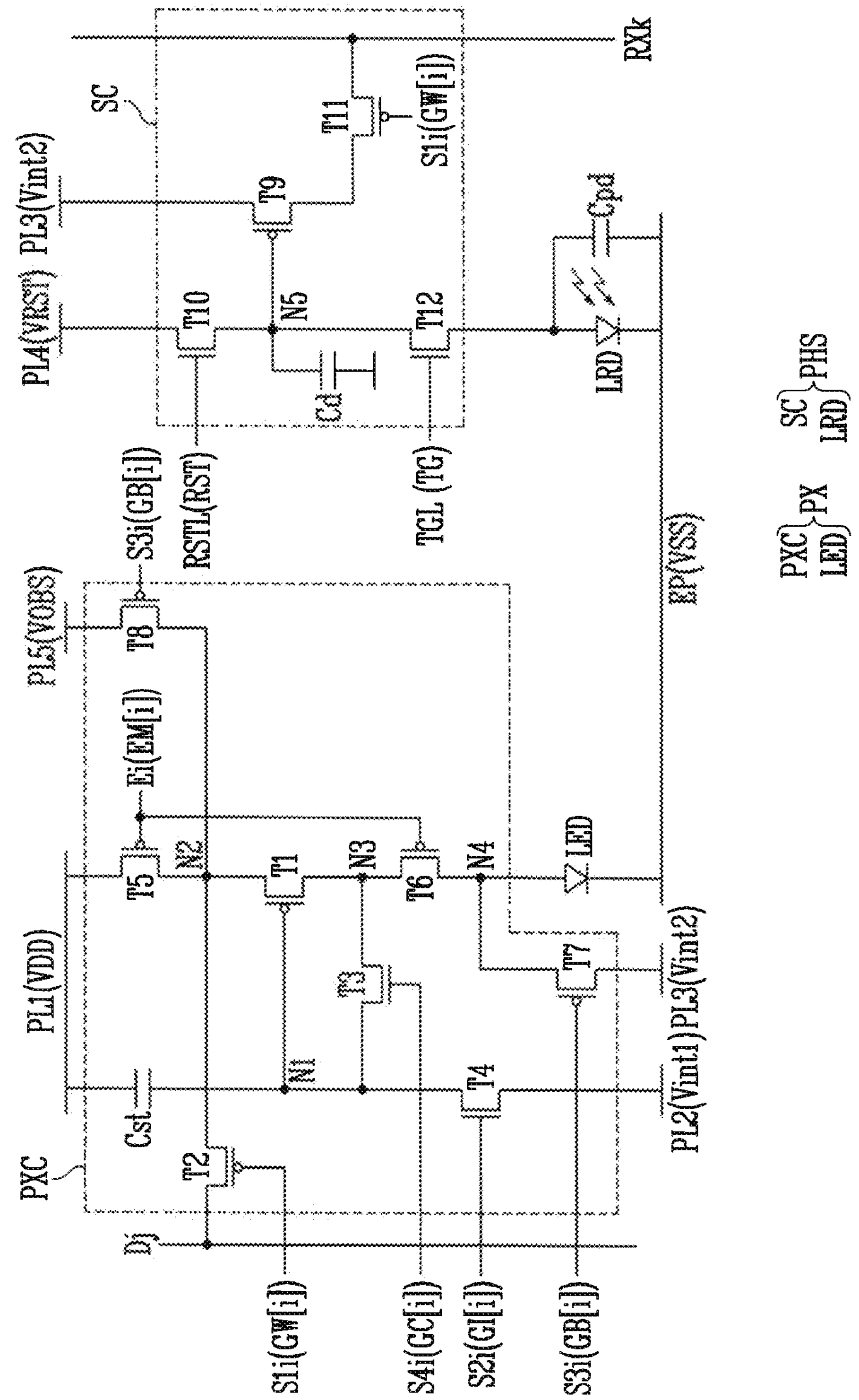
FIG. 5 is a circuit diagram illustrating an example of a pixel and a photosensor, which are included in the display area shown in FIG. 4.

FIG. 5 is a circuit diagram illustrating an example of the pixel and the photosensor, which are included in the display area shown in FIG. 4. For convenience of description, a pixel PX which is disposed on an ith horizontal line (or ith pixel row) and is connected to a jth data line Dj is illustrated in FIG. 5. In addition, ith scan lines S1*i* to S4*i* (and a jth emission control line Ei) may be included in the scan lines S1 to Sn or the ith scan line Si, as shown in FIG. 2.

Referring to FIGS. 1 to 5, a pixel PX and a photosensor PHS may be disposed on an ith horizontal line.

The pixel PX may include a light-emitting element LED and a pixel circuit PXC. The pixel circuit PX may include a first transistor T1 and a second transistor T2. In an embodiment, the pixel circuit PXC may further include third, fourth, fifth, sixth, seventh, and eighth transistors T3, T4, T5, T6, T7, and T8 and a storage capacitor Cst.

The first transistor T1 (or driving transistor) may be connected between a first power line PL1 and a first electrode of the light-emitting element LED. The first transistor T1 may include a gate electrode connected to a first node N1. The first transistor T1 may control an amount of current (or driving current) flowing from the first power line PL1 to an electrode EP (or power line) via the light-emitting element LED, based on a voltage of the first node N1. A first power voltage VDD may be provided to the first power line PL1, and a second power voltage VSS may be provided to the electrode EP. The first power voltage VDD may be set as a voltage higher than the second power voltage VSS.

The second transistor T2 (or switching transistor) may be connected to a jth data line Dj and a second node N2. A gate electrode of the second transistor T2 may be connected to a 1ith scan line S1*i* (or first scan line). The second transistor T2 may be turned on in a case in which a first scan signal GW[i] (e.g., a first scan signal having a low level) is supplied to the 1ith scan line S1*i*, to electrically connect the jth data line Dj and the second node N2 to each other. In a case in which each of the first transistor T1 and the third transistor T3 is in a turn-on state, the second transistor T2 may transfer a data signal of the jth data line Dj to the first node N1 in response to the first scan signal GW[i].

The third transistor T3 may be connected between the first node N1 and a third node N3. A gate electrode of the third transistor T3 may be connected to a 4ith scan line S4*i* (or fourth scan line). The third transistor T3 may be turned on in a case in which a fourth scan signal GC[i] is supplied to the 4ith scan line S4*i*. In a case in which the third transistor T3 is turned on, the first transistor T1 may be diode-connected.

The fourth transistor T4 may be connected between the first node N1 and a second power line PL2. A gate electrode of the fourth transistor T4 may be connected to a 2ith scan line S2*i* (or second scan line). A first initialization power voltage Vint1 may be provided to the second power line PL2. The fourth transistor T4 may be turned on by a second scan signal GI[i] supplied to the 2ith scan line S2*i*. In a case in which the fourth transistor T4 is turned on, the first initialization power voltage Vint1 may be supplied to the first node N1 (e.g., the gate electrode of the first transistor T1).

The fifth transistor T5 may be connected between the first power line PL1 and the second node N2. A gate electrode of the fifth transistor T5 may be connected to an ith emission control line Ei. The sixth transistor T6 may be connected between the third node N3 and the light-emitting element LED (or a fourth node N4). A gate electrode of the sixth transistor T6 may be connected to the ith emission control line Ei. The fifth transistor T5 and the sixth transistor T6 may be turned off in a case in which an emission control signal EM[i] (e.g., an emission control signal EM[i] having a high level) is supplied to the ith emission control line Ei, and be turned on in other cases.

The seventh transistor T7 may be connected between the first electrode of the light-emitting element LED (e.g., the fourth node N4) and a third power line PL3. A gate electrode of the seventh transistor T7 may be connected to a 3ith scan line S3*i* (or third scan line). A second initialization power voltage Vint2 may be provided to the third power line PL3. The second initialization power voltage Vint2 may be about equal to or different from the first initialization power voltage Vint1. The seventh transistor T7 may be turned on by a third scan signal GB[i] supplied to the 3ith scan line S3*i*, to supply the second initialization power voltage Vint2 to the first electrode of the light-emitting element LED.

The eighth transistor T8 may be connected between a fifth power line PL5 and the second node N2. A gate electrode of the eighth transistor T8 may be connected to the 3ith scan line S3*i*. A bias voltage VOBS may be provided to the fifth power line PL5. The eighth transistor T8 may be turned on by the third scan signal GB[i] supplied to the 3ith scan line S3*i*, to supply the bias voltage VOBS to the second node N2.

The storage capacitor Cst (or capacitor) may be connected or formed between the first power line PL1 and the first node N1.

The photosensor PHS may include a sensor circuit SC and a light-receiving element LRD. The sensor circuit SC may include a ninth, tenth, eleventh, and twelfth transistors T9, T10, T11, and T12.

The ninth and eleventh transistors T9 and T11 may be connected in series between the third power PL3 (or reference power line) and a kth readout line RXk (k is a positive integer).

The ninth transistor T9 (or first sensor transistor) may be connected between the third power line PL3 and the eleventh transistor T11. A gate electrode of the ninth transistor T9 may be connected to a fifth node N5 (or sensor node). The ninth transistor T9 may control a current flowing from the third power line PL3 to the kth readout line RXk through the eleventh transistor T11 in response to a voltage of the fifth node N5. A capacitor Cd (or parasitic capacitor) may be formed between the fifth node N5 and an arbitrary signal line (e.g., a fourth power line PL4).

The tenth transistor T10 (or second sensor transistor) may be connected between the fourth power line PL4 (or reset power line) and the fifth node N5. A gate electrode of the tenth transistor T10 may be connected to a reset control line RSTL. A reset voltage VRST may be provided to the fourth power line PL4.

The eleventh transistor T11 (or third sensor transistor) may be connected between the ninth transistor T9 and the kth readout line RXk. A gate electrode of the eleventh transistor T11 may be connected to the 1ith scan line S1*i*. That is, the gate electrode of the eleventh transistor T11 and the gate electrode of the second transistor T2 may share the 1ith scan line S1*i* with each other.

Figure 11:
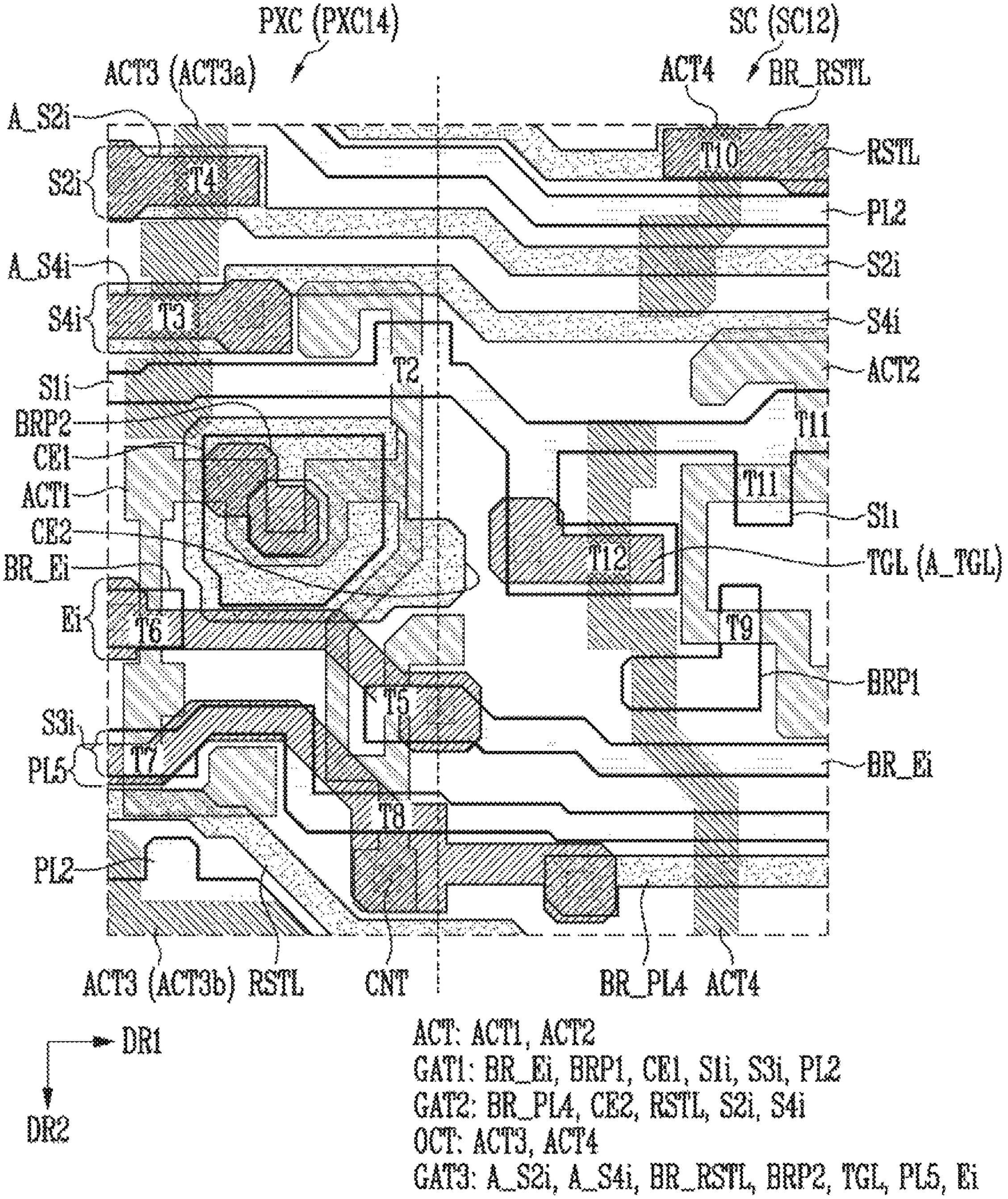
FIGS. 11 and 12 are plan views illustrating an embodiment of the display area shown in FIG. 4.

The eleventh transistor T11 may include two sub-transistors connected in series to each other between the ninth transistor T9 and the kth readout line RXk (see FIG. 11). That is, the eleventh transistor T11 may be implemented as a dual gate transistor. Thus, current leakage through the eleventh transistor T11 and a sensing error of the sensor circuit SC, which is caused by the current leakage, can be reduced, and the stability of the photosensor PHS can be improved.

The twelfth transistor T12 (or fourth sensor transistor) may be connected between the light-receiving element LRD and the fifth node N5. A gate electrode of the twelfth transistor T12 may be connected to a gate line TGL. The twelfth transistor T12 may be turned on by a gate signal TG (or control signal) supplied to the gate line TFL, to connect the light-receiving element LRD to the fifth node N5.

In an embodiment, the gate signal TG provided to the gate line TGL and the first scan signal GW[i] provided to the 1ith scan line S1*i* may have a same wavelength and a same phase. In an embodiment, the gate line TGL may be connected to the 1ith scan line S1*i*.

At least one light-receiving element LRL may be connected between the fifth node N5 and the electrode EP to which the second power voltage VSS is provided. The light-receiving element LRD may generate charges (or current), based on incident light. That is, the light-receiving element LRD may perform a photoelectric conversion function. For example, the light-receiving element LRD may be implemented as a photo diode. A capacitor Cpd (or parasitic capacitor) may be formed between an anode electrode of the light-receiving element LRD and the electrode EP.

In a case in which the tenth transistor T10 is turned on by the reset signal RST supplied to the reset control line RSTL, the reset voltage VRST may be provided to the fifth node N5. For example, the voltage of the fifth node N5 may be reset by the reset voltage VRST. The light-receiving element LRD may perform the photoelectric conversion function from after the reset voltage VRST is applied to the fifth node N5.

The voltage of the fifth node N5 may be changed by an operation of the receiving element LRD. The voltage of the fifth node N5 (or charges or a current, generated by the light-emitting element LRD) may be changed according to an intensity of light incident onto the light-receiving element LRD and a time for which the light is incident (or a time for which the light-receiving element LRD is exposed to the light).

In a case in which the eleventh transistor T11 is turned on by the first scan signal GW[i] supplied to the 1ith scan line S1*i*, a detection value (current and/or voltage) generated based on the voltage of the fifth node N5 may flow into the kth readout line RXk.

In an embodiment, each of the pixel circuit PXC and the sensor circuit SC may include a p-type transistor and an n-type transistor. In an embodiment, the third transistor T3, the fourth transistor T4, the tenth transistor T10, and the twelfth transistor T12 may be implemented with an oxide semiconductor transistor including an oxide semiconductor (or second type semiconductor). For example, the third transistor T3, the fourth transistor T4, the tenth transistor T10, and the twelfth transistor T12 may be implemented with an n-type oxide semiconductor transistor, and include an oxide semiconductor layer as an active layer.

The oxide semiconductor transistor can be formed through a low-temperature process, and have a charge mobility lower than a charge mobility of a poly-silicon semiconductor transistor. That is, the oxide semiconductor transistor has an excellent off-current characteristic. Thus, current leakage in the third transistor T3, the fourth transistor T4, the tenth transistor T10, and the twelfth transistor T12 can be minimized or reduced.

The other transistors (e.g., first, second, fifth, sixth, seventh, eighth, ninth, and eleventh transistors T1, T2, T5, T6, T7, T8, T9, and T11) may be implemented with the poly-silicon semiconductor transistor including a silicon semiconductor (or first type semiconductor), and include a poly-silicon semiconductor layer as an active layer. For example, the active layer may be formed through a low-temperature poly-silicon (LTPS) process. For example, the poly-silicon semiconductor transistor may be a p-type poly-silicon transistor. The poly-silicon semiconductor transistor may be applied to a switching element that operates with fast switching due to its high response speed.

Figure 6:
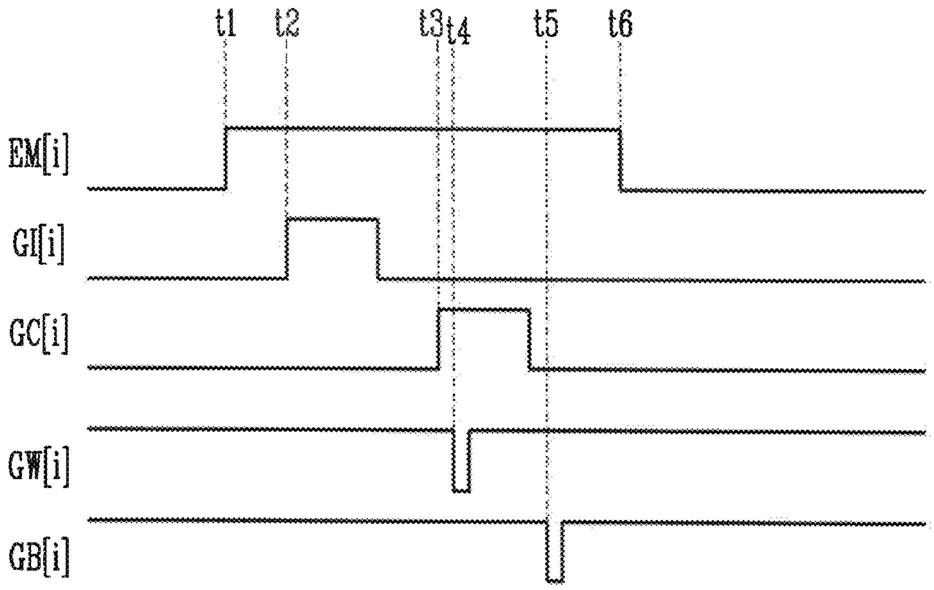
FIG. 6 is a waveform diagram illustrating an embodiment of an operation of the pixel shown in FIG. 5.

FIG. 6 is a waveform diagram illustrating an embodiment of an operation of the pixel shown in FIG. 5.

Referring to FIGS. 1, 2, 5, and 6, the emission control signal EM[i] may be provided to the ith emission control line Ei, the second scan signal GI[i] may be provided to the 2ith scan line S2*i*, the fourth scan signal GC[i] may be provided to the 4ith scan line S4*i*, the first scan signal GW[i] may be provided to the 1ith scan signal S1*i*, and the third scan signal GB[i] may be provided to the 3ith scan line S3*i*.

At a time point t1, the emission control signal EM[i] may have a high level (or first voltage level). The fifth transistor T5 and the sixth transistor T6 may be turned off in response to the emission control signal EM[i] having the high level, and thus, the pixel PX does not emit light.

At a time point t2, the second scan signal GI[i] may have a high level. The fourth transistor T4 may be turned on in response to the second scan signal GI[i] having the high level, and the first initialization power voltage Vint1 of the second power line PL2 may be provided to the first node N1 (or the gate electrode of the first transistor T1).

At a time point t3, the fourth scan signal GC[i] may have a high level. The third transistor T3 may be turned on in response to the fourth scan signal GC[i] having the high level, and the first transistor T1 may be diode-connected.

At a time point t4, the first scan signal GW[i] may have a low level (or second voltage level). The second transistor T2 may be turned on in response to the first scan signal GW[i] having the low level, and a data signal from the jth data line Dj may be provided to the second node N2. In addition, the data signal from the second node may be transferred to the first node N1 through the first transistor T1 and the third transistor T3 because the third transistor T3 is in a state in which the third transistor T3 is turned on in response to the fourth scan signal GC[i] having the high level. The voltage of the first node N1 may have a voltage obtained by compensating for a threshold voltage of the first transistor T1 in the data signal because the diode-connected first transistor T1 is maintained by the turned-on third transistor T3.

At a time point t5, the third scan signal GB[i] may have a low level. The seventh transistor T7 may be turned on in response to the third scan signal GB[i] having the low level, and the second initialization power voltage Vint2 may be supplied to the light-emitting element LED. In addition, the eighth transistor T8 may be turned on in response to the third scan signal GB[i] having the low level, and the bias voltage VOBS may be supplied to the second node N2. In an embodiment, the third scan signal GB[i] may be a first scan signal (e.g., GW[i−1]) provided to a previous row. However, the third scan signal GB[i] is not limited thereto.

At a time point t6, the emission control signal EM[i] may have a low level. The fifth transistor T5 and the sixth transistor T6 may be turned on in response to the emission control signal EM[i] having the low level, and a current flowing path may be formed from the first power line PL1 to the electrode EP via the fifth transistor T5, the first transistor T1, the sixth transistor T6, and the light-emitting element LED. A driving current corresponding to the voltage of the first node N1 (e.g., the data signal) may flow through the light-emitting element LED according to an operation of the first transistor T1, and the light-emitting element LED may emit light with a luminance corresponding to the driving current.

Figure 7:
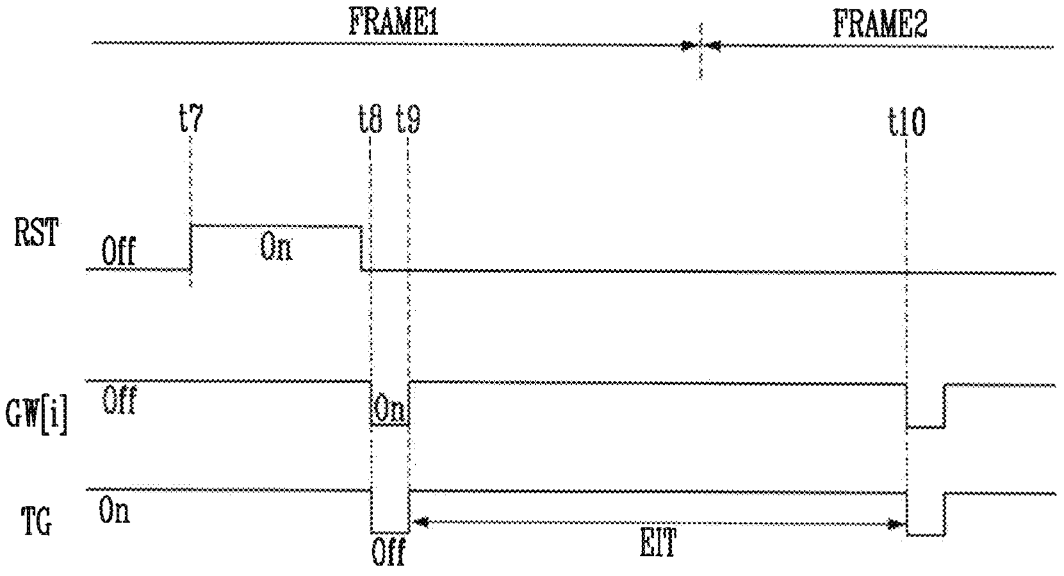
FIG. 7 is a waveform diagram illustrating an embodiment of an operation of the photosensor shown in FIG. 5.
Figure 8:
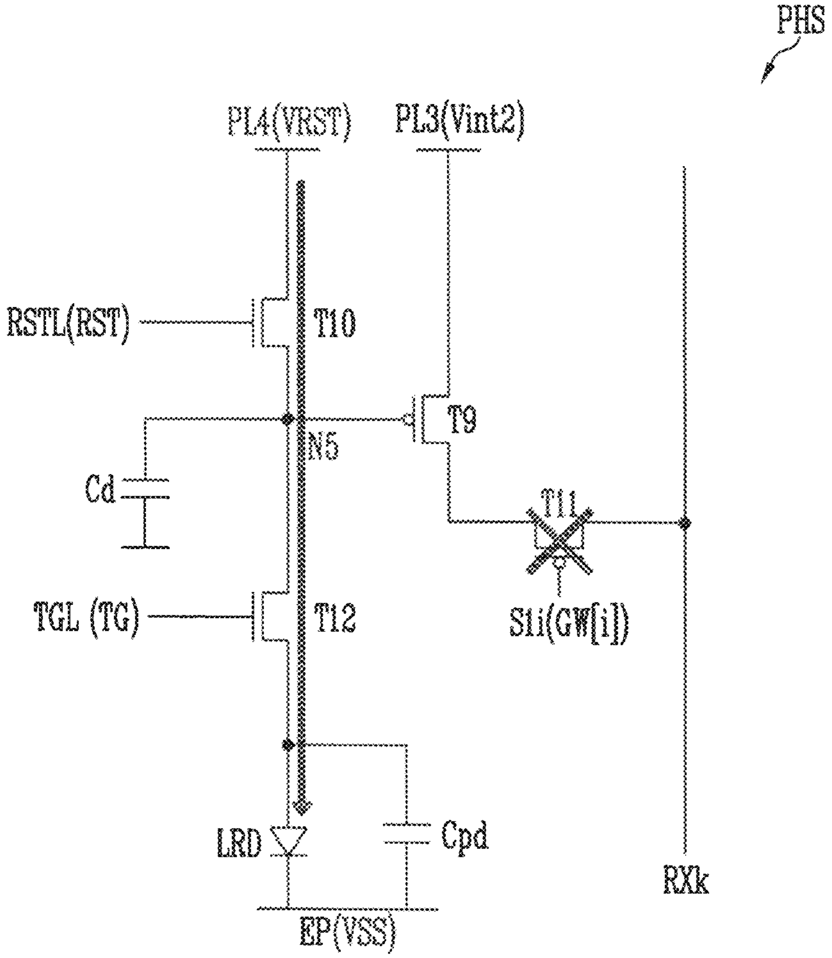
FIGS. 8 to 10 are diagrams illustrating an operation of the photosensor shown in FIG. 5.
Figure 9:
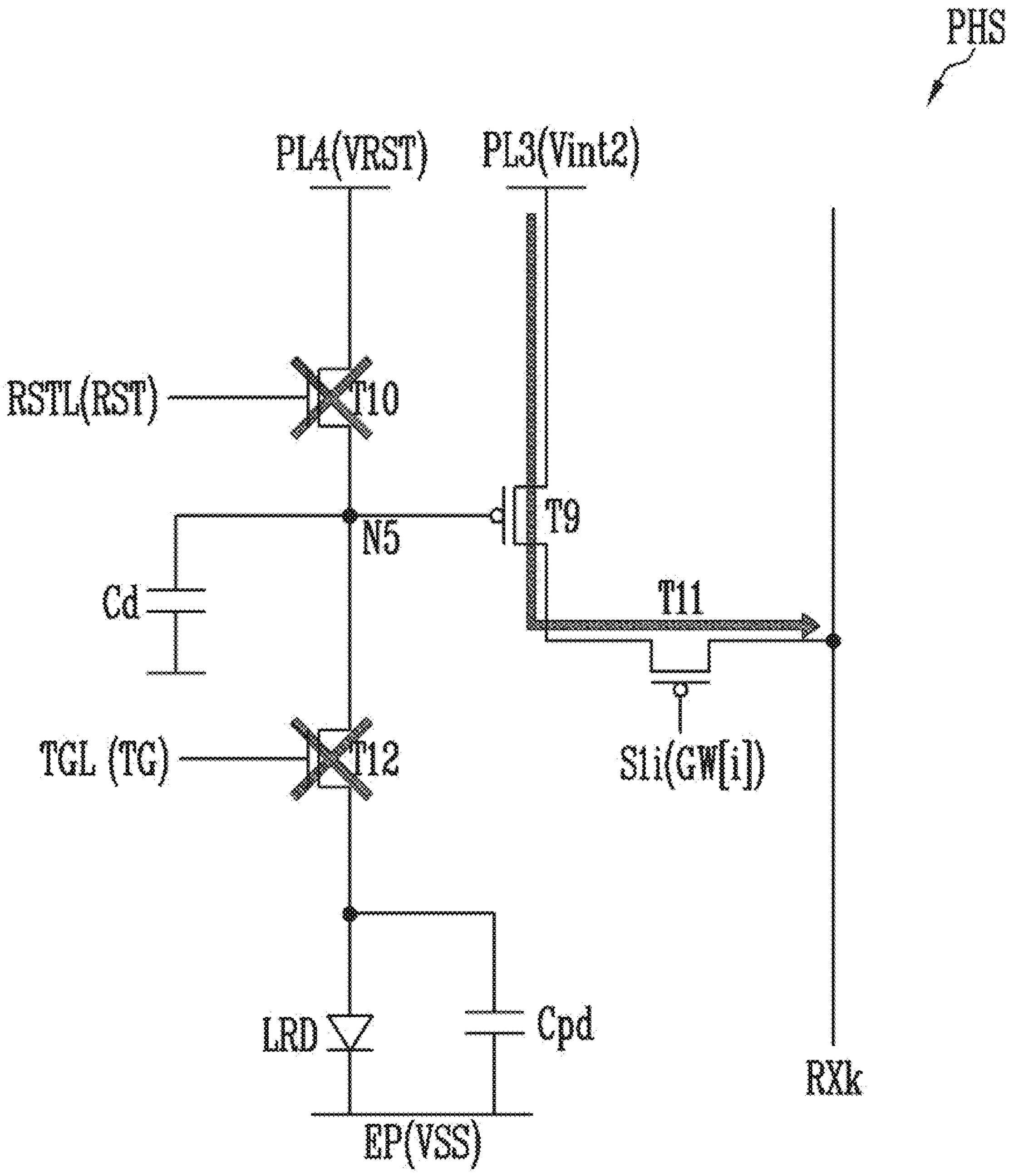
Figure 10:
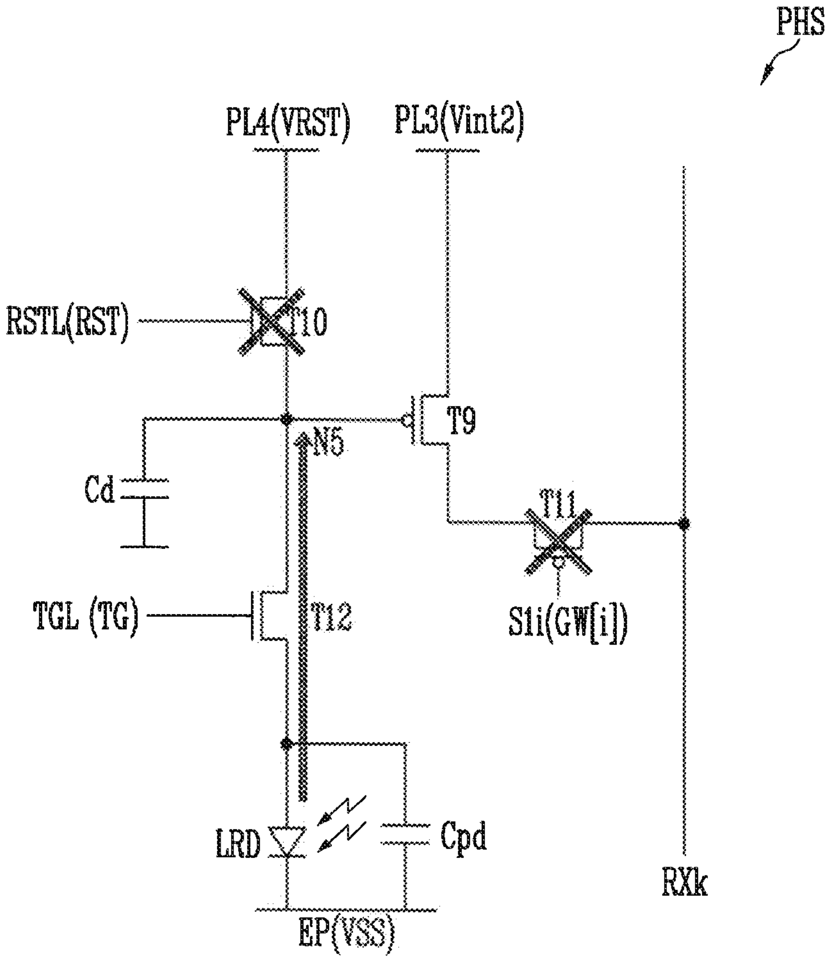

FIG. 7 is a waveform diagram illustrating an embodiment of an operation of the photosensor shown in FIG. 5. FIGS. 8 to 10 are diagrams illustrating an operation of the photosensor shown in FIG. 5.

Referring to FIGS. 7 to 10, the reset signal RST may be provided to the reset control line RSTL, the first scan signal GW[i] may be provided to the first scan line S1*i*, and the gate signal TG may be provided to the gate line TGL. The reset signal RST may be commonly provided to a plurality of photosensors PHS, and the first scan signal GW[i] and the gate signal TG may be sequentially provided to the plurality of photosensors PHS in units of horizontal lines. The gate signal TG and the first scan signal GW[i] may have a same wavelength and a same phase. In some embodiments, the gate signal TG may be the first scan signal GW[i] in a case in which the gate line TGL is connected to the 1ith scan line S1*i*.

A sensing cycle may include a first frame FRAME1 and a second frame FRAME2. The first frame FRAME1 and the second frame FRAME2 may be adjacent to each other (e.g., directly adjacent to each other), but the disclosure is not limited thereto. For example, at least one frame may be disposed between the first frame FRAME1 and the second frame FRAME2. Time points t7 to t10 may sequentially occur in the sensing period.

At a time point t7 (or first time point) of the first frame FRAME1, each of the reset signal RST, the gate signal TG, and the first scan signal GW[i] may have a high level. As shown in FIG. 8, the tenth transistor T10 may be turned on in response to the reset signal RST having the high level, and the voltage of the fifth node N5 (and the capacitor Cd) may be reset by the reset voltage RST. In addition, the twelfth transistor T12 may be turned on in response to the gate signal TG having the high level, the light-receiving element LRD may be connected to the fifth node N5, and the anode electrode of the light-receiving element LRD (and the capacitor Cpd) may be reset. The eleventh transistor T11 may maintain a turn-off state in response to the first scan signal GW[i] having the high level.

After that, at a time point t8 (or second time point), each of the reset signal RST, the first scan signal GW[i], and the gate signal TG may have a low level. As shown in FIG. 9, the tenth transistor T10 may be turned off in response to the reset signal RST having the low level, and the twelfth transistor T12 may be turned off in response to the gate signal TG having the low level. The eleventh transistor T11 may be turned on in response to the first scan signal GW[i] having the low level, and a current corresponding to voltage of the fifth node N5 may flow into the kth readout line RXk from the third power line PL3 through the ninth transistor T9 and the eleventh transistor T11. The current may represent a base or noise from the viewpoint of photo sensing. The current read out through the kth readout line RXk at the time point t8 may be referred to as a first sensing current.

After that, at a time point t9 (or third time point), each of the gate signal TG and the first scan signal GW[i] may have a high level. As shown in FIG. 10, the twelfth transistor T12 may be turned on in response to the gate signal GW[i] having the high level, and the light-receiving element LRD may be connected to the fifth node N5.

In a period between the time point t9 and a time point t10, the light-receiving element LRD may generate charges (or current), based on incident light. In a case in which light is incident onto the light-receiving element LRD during an exposure time EIT, the voltage of the fifth node N5 may be changed by the photoelectric conversion function of the light-receiving element LRD.

After that, at the time point t10 (or fourth time point) of the second frame FRAME2, each of the first scan signal GW[i] and the gate signal TG may have a low level. As shown in FIG. 9, the twelfth transistor T12 may be turned off in response to the gate signal TG having the low level. The eleventh transistor T11 may be turned on in response to the first scan signal GW[i] having the low level, and a current corresponding to the voltage of the fifth node N5 may flow into the kth readout line RXk from the third power line PL3 through the ninth transistor T9 and the eleventh transistor T11. For example, in a case in which a touch input of a user occurs in the display panel 100 shown in FIG. 1, a current corresponding to light reflected by the user (e.g., a finger of the user) may be read out through the kth readout line RXk at the time point t10. The current may represent a light amount during the exposure time EIT, and include the noise at the time point t8. The current read out through the kth readout line RXk at the time point t10 may be referred to as a second sensing current.

The readout circuit 222 shown in FIG. 2 may perform a subtraction operation on the first sensing current read out at the time point t8 (or second time point) and the second sensing current read out at the time point t10 (or fourth time point), thereby acquiring a sensing signal corresponding to the light amount during the exposure time EIT. That is, noise of the sensing signal is removed, and accordingly, a sensing ability can be improved.

In some embodiments, exposure times EIT for the respective plurality of photosensors PHS may be constant or the same. Thus, additional correction of the sensing signal is not required by considering a different in exposure time EIT for each photosensor PHS, and the load of a sensing operation can be reduced.

Figure 12:
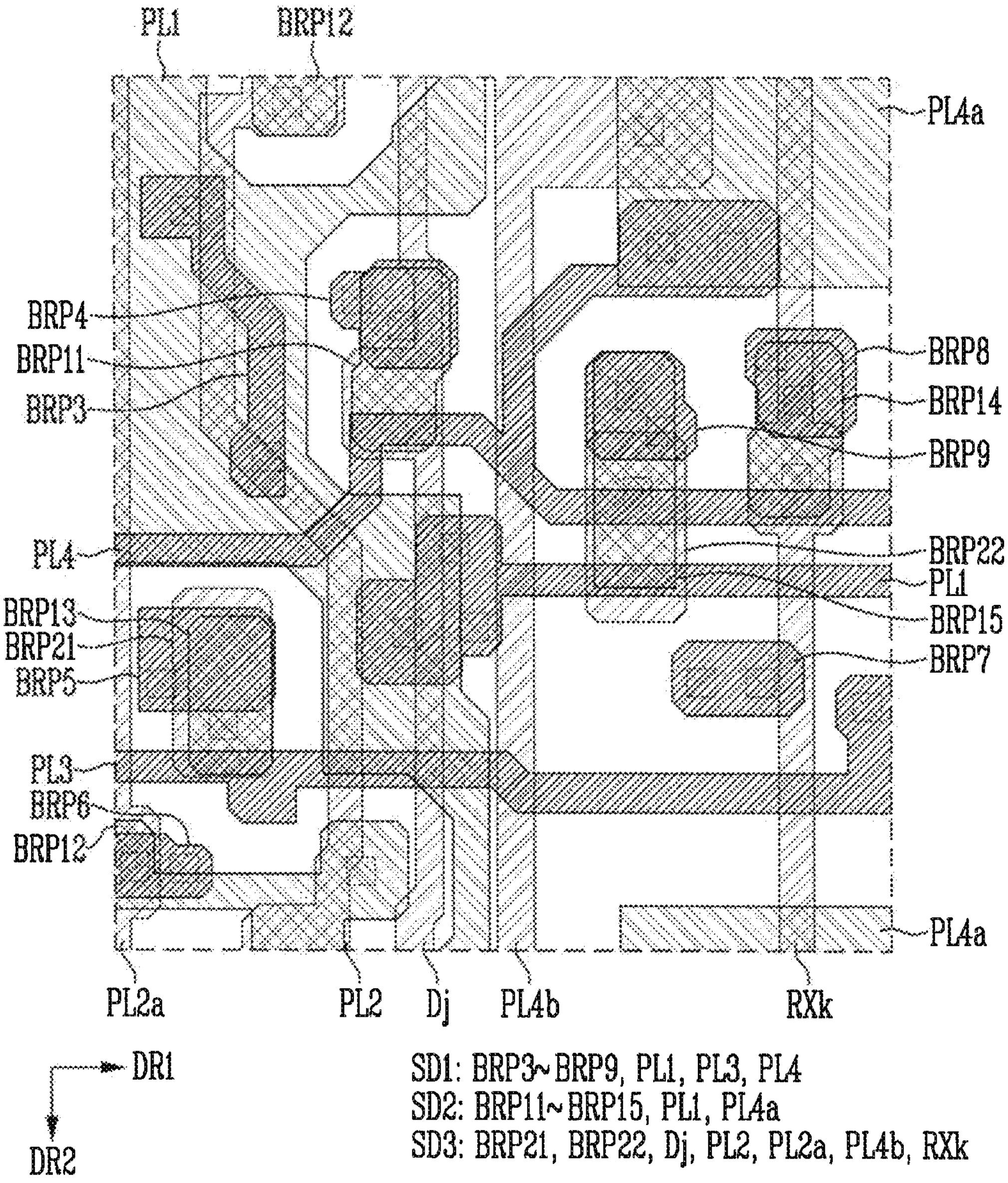
Figure 13:
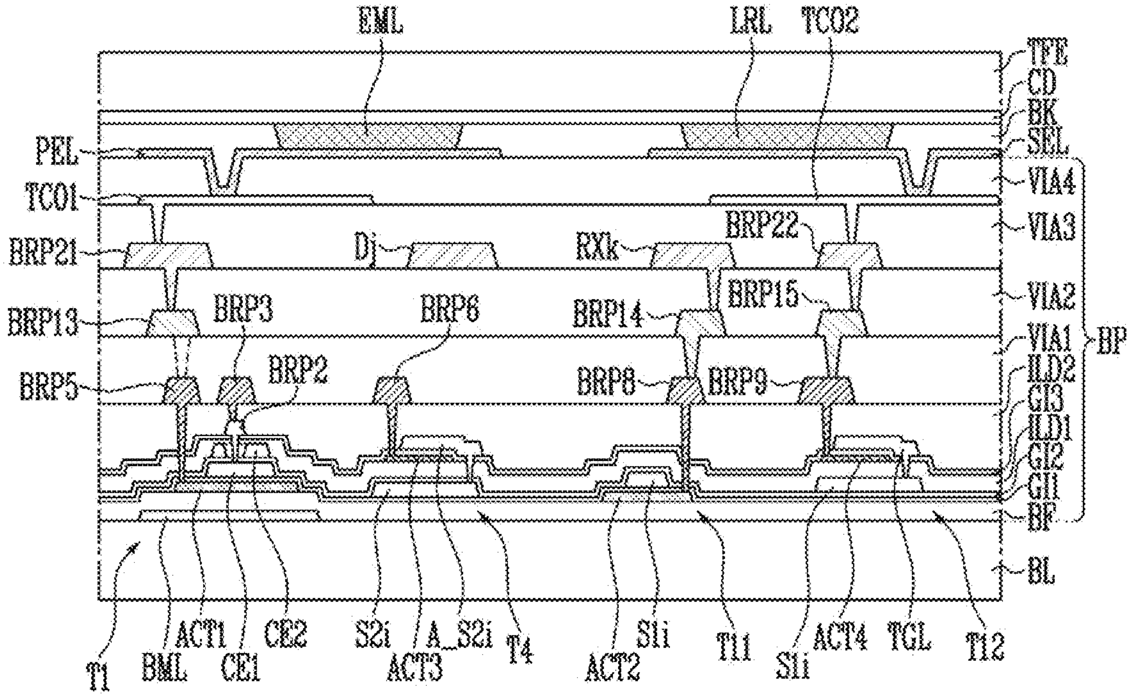
FIG. 13 is a cross-sectional view illustrating an embodiment of the display area shown in FIG. 4.

FIGS. 11 and 12 are plan views illustrating an embodiment of the display area shown in FIG. 4. In FIGS. 11 and 12, the pixel circuit PXC and the sensor circuit SC, which are shown in FIG. 5, are illustrated. FIG. 13 is a cross-sectional view illustrating an embodiment of the display area shown in FIG. 4.

In FIGS. 11 to 13, a sub-pixel is simplified for illustration purposes, with each electrode represented as having a single-layer structure and each insulating layer depicted as a single layer. However, the disclosure is not limited thereto.

In embodiments of the disclosure, "being formed and/or provided in a same layer" may mean being formed through a same process, and "being formed and/or provided in different layers" may mean being formed through different processes.

Referring to FIGS. 4, 5, and 11 to 13, the pixel circuit PXC and the sensor circuit SC may correspond to the fourth pixel circuit PXC14 and the second sensor circuit SC12 of the first pixel row R1 shown in FIG. 4, respectively. Each of the other pixel circuits PXC11 to PXC13 and PXC21 to PXC24 shown in FIG. 4 may be substantially identical to the fourth pixel circuit PXC14 or be laterally symmetrical to the fourth pixel circuit PXC14. In addition, each of the other sensor circuits SC11, SC21, and SC22 shown in FIG. 4 may be substantially identical or similar to the second sensor circuit SC12. In FIG. 13, the first transistor T1, the fourth transistor T4, the eleventh transistor T11, and the twelfth transistor T12 are exemplarily illustrated. Each of the other transistors T2, T3, T5, T6, T7, T8, T9, and T10 may have a cross-sectional structure substantially identical or similar to a cross-sectional structure of the eleventh transistor T11 or the twelfth transistor T12.

Hereinafter, components will be described according to an order in which the components are stacked on a base layer BL, based on FIG. 13.

The base layer BL (or substrate) may be made of an insulative material such as glass or resin. The base layer BL may be made of a material having reflexibility to be curvable or foldable. The base layer BL may have a single-layer structure or a multi-layer structure.

A backplane structure BP including the pixel circuit PXC and the sensor circuit SC may be provided on the base layer BL. The backplane structure BP may include a semiconductor layer, a plurality of conductive layers, and a plurality of insulating layers.

A buffer layer BF may be provided on the base layer BL. The buffer layer BF may be an insulating layer including an inorganic material. For example, the inorganic material may include at least one of silicon nitride ($SiN_x$), silicon oxide ($SiO_x$), silicon oxynitride ($SiO_xN_y$), or a metal oxide such as aluminum oxide ($AlO_x$). The buffer layer BF may be provided as a single layer, or may be provided as a multi-layer including at least two layers. The buffer layer BF may prevent an impurity from being diffused into a transistor.

In some embodiments, a lower electrode BML may be disposed between the base layer BL and the buffer layer BF. The lower electrode BML may overlap the first transistor T1 (or a first capacitor electrode CE1 and a second capacitor electrode CE2). The lower electrode BML may shield the first transistor T1 (or the first capacitor electrode CE1 and the second capacitor electrode CE2) under the first transistor T1 (or the first capacitor electrode CE1 and the second capacitor electrode CE2). A constant voltage may be applied to the lower electrode BML. For example, the first power voltage VDD may be applied to the lower electrode BML, but the disclosure is not limited thereto. The lower electrode BML may include a conductive material.

A first active layer ACT (or first semiconductor layer) may be disposed on the buffer layer BF. The first active layer ACT may include a first semiconductor pattern ACT1 of the pixel circuit PXC and a second semiconductor pattern ACT2 of the sensor circuit SC. The first semiconductor pattern ACT1 and the second semiconductor pattern ACT2 may include a poly-silicon semiconductor.

The first semiconductor pattern ACT1 overlapping the first capacitor CE1 may constitute a channel region of the first transistor T1. The first semiconductor pattern ACT1 may extend in the second direction DR2 from both opposite ends of the channel region of the first transistor T1. The first semiconductor pattern ACT1 overlapping an ith emission control line Ei (or an emission bridge pattern BR_Ei) may constitute a channel region of the fifth transistor T5 and a channel region of the sixth transistor T6. The first semiconductor pattern ACT1 may further extend in the second direction DR2 from the channel region of the sixth transistor T6. The first semiconductor pattern ACT1 overlapping a 3ith scan line S3*i* may constitute a channel region of the seventh transistor T7. The first semiconductor pattern ACT1 may further extend in the second direction DR2 from the channel region of the fifth transistor T5. The first semiconductor pattern ACT1 overlapping the 3ith scan line S3*i* may constitute a channel region of the eighth transistor T8. The first semiconductor pattern ACT1 may extend in the opposite direction of the second direction DR2 from a right end portion of the channel region of the first transistor T1. The first semiconductor pattern ACT1 overlapping a first scan line S1*i* may constitute a channel region of the second transistor T2.

A channel region is, for example, a semiconductor patten undoped with an impurity, and may be an intrinsic semiconductor. The other region of the semiconductor pattern (e.g., the other region of the first semiconductor pattern ACT1) except the channel region may be a semiconductor pattern doped with the impurity.

The second semiconductor pattern ACT2 may be spaced apart from the first semiconductor pattern ACT1 in the first direction DR1. The second semiconductor pattern ACT2 overlapping a first bridge pattern BRP1 may constitute a channel region of the ninth transistor T9. The second semiconductor pattern ACT2 overlapping the 1ith scan line S1*i* may constitute a channel region of the eleventh transistor T11 (or two sub-transistors).

A first gate insulating layer GI1 (or first insulating layer) may be disposed over the first active layer ACT. The first gate insulating layer GI1 may be an insulating layer made of an inorganic material.

A first conductive layer GAT1 may be disposed on the first gate insulating layer GI1. The first conductive layer GAT1 may include a conductive material. For example, the conductive material may include copper (Cu), molybdenum (Mo), tungsten (W), aluminum neodymium (AlNd), titanium (Ti), aluminum (Al), silver (Ag), and/or any alloy thereof. The first conductive layer GAT1 may include the lower electrode BML.

The first conductive layer GAT1 may include the first capacitor electrode CE1 may include the first capacitor electrode CE1, the first bridge pattern BRP1, the emission bridge pattern BR_Ei, the 1ith scan line S1*i*, the 3ith scan line S3*i*, and a second power line PL2. The emission bridge pattern BR_Ei may be connected to the ith emission control line Ei which will be described further below.

The first capacitor electrode CE1 overlapping the first semiconductor pattern ACT1 may constitute the gate electrode of the first transistor T1.

The first bridge pattern BRP1 overlapping the first semiconductor pattern ACT1 may constitute the gate electrode of the ninth transistor T9.

The 1ith scan line S1*i* and the emission bridge pattern BR_Ei may be spaced apart from each other while the first capacitor electrode CE1 is interposed between the 1ith scan line S1*i* and the emission bridge pattern BR_Ei. Each of the 1ith scan line S1*i*, the emission bridge patten BR_Ei, the 3ith scan line S3*i*, and the second power line PL2 may substantially extend in the first direction DR1.

The 1ith scan line S1*i* overlapping the first semiconductor pattern ACT1 may constitute the gate electrode of the second transistor T2.

The 1ith scan line S1*i* overlapping the second semiconductor pattern ACT may constitute the gate electrode of the eleventh transistor T11. In an embodiment, the 1ith scan line S1*i* may overlap a channel region of the twelfth transistor T12. In some embodiments, the 1ith scan line S1*i* may include a protruding portion that overlaps the channel region of the twelfth transistor T12.

The emission bridge pattern BR_Ei overlapping the first semiconductor pattern ACT1 may constitute the gate electrode of the fifth transistor T5 and the gate electrode of the sixth transistor T6.

The 3ith scan line S3*i* overlapping the first semiconductor pattern ACT1 may constitute the gate electrode of the seventh transistor T7 and the gate electrode of the eighth transistor T8.

A second gate insulating layer GI2 (or second insulating layer) may be disposed over the first conductive layer GAT1. The second gate insulating layer GI2 may be an insulating layer made of an inorganic material.

A second conductive layer GAT2 may be disposed on the second gate insulating layer GI2. The second conductive layer GAT2 may include a conductive material. The second conductive layer GAT2 may include the second capacitor electrode CE2, a 2ith scan line S2*i*, a 4ith scan line S4*i*, a reset control line RSTL, and a fourth power bridge pattern BR_PL4.

The second capacitor electrode CE2 may overlap the first capacitor electrode CE1, and form the storage capacitor Cst. Most portions of the second capacitor electrode CE2 may overlap the first capacitor electrode CE1. The second capacitor electrode CE2 may include an opening exposing the first capacitor electrode CE1.

On a plane (in a plan view), the 2ith scan line S2*i*, the 4ith scan line S4*i*, the reset control line RSTL, and the fourth power bridge pattern BR_PL4 may be spaced apart from each other in the second direction DR2, and each of the 2ith scan line S2*i*, the 4ith scan line S4*i*, the reset control line RSTL, and the fourth power bridge pattern BR_PL4 may substantially extend in the first direction DR1.

A first interlayer insulating layer ILD1 (or third insulating layer) may be disposed over the second conductive layer GAT2. The first interlayer insulating layer ILD1 may be an insulating layer made of an inorganic material.

A second active layer OCT (or second semiconductor layer) may be disposed on the first interlayer insulating layer ILD1. The second active layer OCT may include a third semiconductor pattern ACT3 of the pixel circuit PXC and a fourth semiconductor pattern ACT4 of the sensor circuit SC. The third semiconductor pattern ACT3 and the fourth semiconductor pattern ACT4 may include an oxide semiconductor.

The third semiconductor pattern ACT3 (or a 3ath semiconductor pattern ACT3*a*) overlapping the 2ith scan line S2*i* (and a 2ith scan gate electrode A_S2*i*) may constitute a channel region of the fourth transistor T4. The third semiconductor pattern ACT3 overlapping the 4ith scan line S4*i* (and a 4ith scan gate electrode A_S4*i*) may constitute of a channel region of the third transistor T3. The third semiconductor pattern ACT3 (or a 3bth semiconductor pattern ACT3*b*) may partially overlap the second power line PL2. The fourth semiconductor pattern ACT4 overlapping the reset control line RSTL (and a reset bridge pattern BR_RSTL) may constitute a channel region of the tenth transistor T10. The fourth semiconductor pattern ACT4 overlapping a gate line TGL (or a gate pattern A_TGL) may constitute the channel region of the twelfth transistor T12.

A third gate insulating layer GI3 (or fourth insulating layer) may be disposed over the second active layer OCT. The third gate insulating layer GI3 may be an insulating layer made of an inorganic material.

A third conductive layer GAT3 may be disposed on the third gate insulating layer GI3. The third conductive layer GAT3 may include a conductive material. The third conductive layer GAT3 may include the 2ith scan gate electrode A_S2*i*, the 4ith scan gate electrode A_S4*i*, the ith emission control line Ei, a fifth power line PL5, and the gate line TGL.

The 2ith scan gate electrode A_S2*i* may be connected to the 2ith scan line S2*i* through a contact hole CNT penetrating the third gate insulating layer GI3 and the first interlayer insulating layer ILD1. The 2ith scan gate electrode A_S2*i* overlapping the third semiconductor pattern ACT3 may constitute the gate electrode of the fourth transistor T4.

The 4ith scan gate electrode A_S4*i* may be connected to the 4ith scan line S4*i* through a contact hole. The 4ith scan gate electrode A_S4*i* overlapping the third semiconductor pattern ACT3 may constitute the gate electrode of the third transistor T3.

The reset bridge pattern BR_RSTL may be connected to the reset control line RSTL through a contact hole CNT. The reset bridge pattern BR_RSTL overlapping the fourth semiconductor pattern ACT4 may constitute the gate electrode of the tenth transistor T10.

The ith emission control line Ei may be connected to the emission bridge pattern BR_Ei through a contact hole CNT.

The fifth power line PL5 may be connected to the fourth power bridge pattern BR_PL4 through a contact hole. The fifth power line PL5 may be connected to the first semiconductor pattern ACT1 through a contact hole.

The gate line TGL may extend in the first direction DR1. The gate line TGL overlapping the fourth semiconductor pattern ACT4 may constitute the gate electrode of the twelfth transistor T12. In some embodiments, the gate line TGL may overlap the 1ith scan line S1*i* (or the protruding portion of the 1ith scan line S1*i*).

A second interlayer insulating layer ILD2 may be disposed over the third conductive layer GAT3. The second interlayer insulating layer ILD2 may be an insulating layer made of an inorganic material, but the disclosure is not limited thereto.

A fourth conductive layer SD1 may be disposed on the second interlayer insulating layer ILD2. The fourth conductive layer SD1 may include a conductive material. The fourth conductive layer SD1 may include third to ninth bridge patterns BRP3 to BRP9, a first power line PL1, a third power line PL3, and a fourth power line PL4.

The third bridge pattern BRP3 may be connected to the third semiconductor pattern ACT3 (e.g., the third semiconductor pattern ACT between the third transistor T3 and the fourth transistor T4) through a contact hole. The third bridge pattern BPR3 may be connected to the first capacitor electrode CE1 through the opening of the second capacitor electrode CE2. The third bridge pattern BPR3 may constitute the first node N1 shown in FIG. 5.

The fourth bride pattern BRP4 may be connected to the first semiconductor pattern ACT1 (e.g., the first semiconductor pattern ACT1 at an upper side of the second transistor T2) through a contact hole.

The fifth bridge pattern BRP5 may be connected to the first semiconductor pattern ACT (e.g., the first semiconductor pattern ACT1 between the sixth transistor T6 and the seventh transistor T7) through a contact hole. The fifth bridge pattern BRP5 may constitute the fourth node N4 shown in FIG. 5.

The sixth bridge pattern BRP6 may be connected to the third semiconductor pattern ACT (or the 3bth semiconductor pattern ACT3*a*) through a contact hole. The sixth bridge pattern BRP6 may be connected to the second power line PL2 through a contact hole. The sixth bridge pattern BRP6 may connect the third semiconductor pattern ACT3 (or the 3bth semiconductor pattern ACT3*b*) to the second power line PL2.

The seventh bridge pattern BRP7 may be connected to the first bridge pattern BRP1 and the fourth semiconductor pattern ACT4 (e.g., the fourth semiconductor pattern ACT4 at a lower side of the twelfth transistor T12) through a contact hole. The seventh bridge pattern BRP7 may connect the first bridge pattern BRP1 and the fourth semiconductor pattern ACT4 to each other, and constitute the fifth node N5 shown in FIG. 5.

The eighth bridge pattern BRP8 may be connected to the second semiconductor pattern ACT2 (e.g., the second semiconductor pattern ACT2 at an upper side of the eleventh transistor T11) through a contact hole.

The ninth bridge pattern BRP9 may be connected to the fourth semiconductor pattern ACT4 (e.g., the fourth semiconductor pattern ACT4 at an upper side of the twelfth transistor T12) through a contact hole.

The first power line PL1, the third power line PL3, and the fourth power line PL4 may be spaced apart from each other in the second direction DR2, and each of the first power line PL1, the third power line PL3, and the fourth power line PL4 may substantially extend in the first direction DR1. That is, power lines (or horizontal power lines) extending in the first direction DR1 may be arranged in the fourth conductive layer SD1.

The first power line PL1 may be connected to the second capacitor electrode CE2 and the first semiconductor pattern ACT1 (e.g., the first semiconductor pattern ACT1 at an upper side of the fifth transistor T5) through a contact hole.

The third power line PL3 may be connected to the second semiconductor pattern ACT2 (e.g., the second semiconductor pattern ACT2 at a lower side of the ninth transistor T9) through a contact hole.

The fourth power line PL4 may be connected to the fourth semiconductor pattern ACT4 (e.g., the fourth semiconductor pattern ACT4 at a lower side of the tenth transistor T10) through a contact hole.

A first via layer VIA1 may be disposed over the fourth conductive layer SD1. The first via layer VIA1 may be an insulating layer made of an inorganic material or an organic material. For example, the organic material may include acrylic resin, epoxy resin, phenolic resin, polyamide resin, and/or polyimide resin.

A fifth conductive layer SD2 may be disposed on the first via layer VIA1. The fifth conductive layer SD2 may include a conductive material. The fifth conductive layer SD2 may include eleventh to fifteenth bridge patterns BRP11 to BRP15, the first power line PL1, and a 4ath power line PL4*a*.

The eleventh bridge pattern BRP11 may be connected to the fourth bridge pattern BRP4 through a contact hole.

The twelfth bridge pattern BRP12 may be connected to the sixth bridge pattern BRP6 through a contact hole.

The thirteenth bridge pattern BRP13 may be connected to the fifth bridge pattern BRP5 through a contact hole.

The fourteenth bridge pattern BRP14 may be connected to the eighth bridge pattern BRP8 through a contact hole.

The fifteenth bridge pattern BRP15 may be connected to the ninth bridge pattern BRP9 through a contact hole.

The first power line PL1 may extend in the second direction DR2, and cover lower components (e.g., the first transistor T1, the fifth transistor T5, and the like). The first power line PL1 may be connected to the first power line PL1 (e.g., a horizontal power line) in the fourth conductive layer SD1 through a contact hole. That is, the first power line PL1 may be disposed throughout the fourth conductive layer SD1 and the fifth conductive layer SD2, and have a mesh structure.

The 4ath power line PL4*a* (or fourth power bridge pattern) may be connected to the fourth power line PL4 through a contact hole.

A second via layer VIA2 may be disposed over the fifth conductive layer SD2. The second via layer VIA2 may be an insulating layer made of an inorganic material or an organic material.

A sixth conductive layer SD3 may be disposed on the second via layer VIA2. The sixth conductive layer SD3 may include a conductive material. The sixth conductive layer SD3 may include a twenty-first bridge pattern BRP21, a twenty-second bridge pattern BRP22, a jth data line Dj, a kth readout line RXk, a second power line PL2, a 2ath power line PL2*a*, and a 4bth power line PL4*b*.

The twenty-first bridge pattern BRP21 may be connected to the thirteenth bridge pattern BRP13 through a contact hole. A light-emitting element LED may be connected to the sixth transistor T6 through the twenty-first bridge pattern BRP21, the thirteenth bridge pattern BRP13, and the fifth bridge pattern BRP5.

The twenty-second bridge pattern BRP22 may be connected to the fifteenth bridge pattern BRP15 through a contact hole. A light-receiving element LRD may be connected to the twelfth transistor T12 through the twenty-second bridge pattern BRP22, the fifteenth bridge pattern BRP15, and the ninth bridge pattern BRP9.

The jth data line Dj, the kth readout line RXk, the second power line PL2, the 2ath power line PL2*a*, and the 4bth power line PL4*b* may be spaced apart from each other in the first direction DR1, and each of the jth data line Dj, the kth readout line RXk, the second power line PL2, the 2ath power line PL2*a*, and the 4bth power line PL4*b* may substantially extend in the second direction DR2. That is, lines (or vertical lines) extending in the second direction DR2 may be arranged in the sixth conductive layer SD3.

The jth data line Dj may be connected to the eleventh bridge pattern BRP11 through a contact hole. The jth data line Dj may be connected to the second transistor T2 through the eleventh bridge pattern BRP11 and the fourth bridge pattern BRP4.

The kth readout line RXk may be connected to the fourteenth bridge pattern BRP14 through a contact hole. The kth readout line RXk may be connected to the eleventh transistor T11 through the fourteenth bridge pattern BRP14 and the eighth bridge pattern BRP8.

The second power line PL2 and the 2ath power line PL2*a* may be connected to the twelfth bridge pattern BRP12 through a contact hole. The second power line PL2 and the 2ath power line PL2*a* may be connected to the second power line PL2 of the first conductive layer GAT1 through the twelfth bridge pattern BRP12. That is, the second power line PL2 may be disposed throughout the fourth conductive layer SD1 and the sixth conductive layer SD3, and have a mesh structure.

The 4bth power line PL4*b* may be connected to the 4ath power line PL4*a* through a contact hole. The 4bth power line PL4*b* may be connected to the fourth power line PL4 through the 4ath power line PL4*a*. That is, the fourth power line PL4 may be disposed throughout the fourth conductive layer SD1 and the sixth conductive layer SD3, and have a mesh structure.

A third via layer VIA3 and a fourth via layer VIA4 may be disposed over the sixth conductive layer SD3. Each of the third via layer VIA3 and the fourth via layer VIA4 may be an insulating layer made of an inorganic material or an organic material.

A first connection electrode TCO1 and a second connection electrode TCO2 may be disposed between the third via layer VIA3 and the fourth via layer VIA4. The first connection electrode TCO1 may extend from the twenty-first bridge pattern BRP21 to the light-emitting element LED (e.g., the fourth light-emitting element LED4) (see FIG. 4), to connect the twenty-first bridge pattern BRP21 and the light-emitting element LED to each other. Similarly, the second connection electrode TCO2 may extend from the twenty-second bridge pattern BRP22 to the light-receiving element LRD (e.g., the second light-receiving element LRD2 shown in FIG. 4), to connect the twenty-second bridge pattern BRP22 and the light-receiving element LRD to each other.

A pixel layer including a pixel electrode PEL, a sensor electrode SEL, and a bank layer BK may be provided on the fourth via layer VIA4.

The pixel layer may include the light-emitting element LED connected to the pixel circuit PXC and the light-receiving element LRD connected to the sensor circuit SC.

In an embodiment, the light-emitting element LED may include the pixel electrode PEL, a light-emitting layer EML, and a common electrode CD. In an embodiment, the light-receiving element LRD may include the sensor electrode SEL, a light-receiving layer LRL, and the common electrode CD.

In an embodiment, the pixel electrode PEL and the sensor electrode SEL may be made of a metal layer such as, for example, silver (Ag), magnesium (Mg), aluminum (Al), platinum (Pt), palladium (Pd), gold (Au), nickel (Ni), neodymium (Nd), iridium (Ir), chromium (Cr), or any alloy thereof, and/or indium tin oxide (ITO), indium zinc oxide (IZO), zinc oxide (ZnO), indium tin zinc oxide (ITZO), or the like. The pixel electrode PEL and the sensor electrode SEL may be simultaneously formed through patterning using a mask.

The bank layer BK (or pixel defining layer) partitioning a light-emitting area and a light-receiving area may be provided on the fourth via layer VIA4 on which the pixel electrode PEL and the sensor electrode SEL are formed. The bank layer BK may include opening corresponding to the light-emitting area and the light-receiving area. The bank layer BK may be an insulating layer made of an organic material.

In some embodiments, the bank layer BK may include a light absorption material or have a light absorber coated on the bank layer, to absorb external light. For example, the bank layer BK may include a carbon-based black pigment. However, the disclosure is not limited thereto, and the bank layer BK may include an opaque metal material, such as, for example, chromium (Cr), molybdenum (Mo), any alloy (MoTi) of molybdenum and titanium, tungsten (W), vanadium (V), niobium (Nb), tantalum (Ta), manganese (Mn), cobalt (Co) or nickel (Ni), which has a high absorption rate.

The light-emitting layer EML may be provided on a top surface of the pixel electrode PEL exposed by the bank layer BK, and the light-receiving layer LRL may be provided on a top surface of the sensor electrode exposed by the bank layer BK. In an embodiment, the light-emitting layer EML may be implemented as an organic light-emitting layer. The light-emitting layer EML may emit light, such as red light, green light, or blue line, according to an organic material included in the light-emitting layer EML. The light-receiving layer LRL may emit electrons, corresponding to light in a specific wavelength band, thereby sensing an intensity of light.

The common electrode CD may be provided on the light-emitting layer EML and the light-receiving layer LRL. The second power voltage VSS may be supplied to the common electrode CD. The common electrode CD may be made of a metal layer such as, for example, silver (Ag), magnesium (Mg), aluminum (Al), platinum (Pt), palladium (Pd), gold (Au), nickel (Ni), neodymium (Nd), iridium (Ir), or chromium (Cr), and/or a transparent conductive layer such as, for example, ITO, IZO, ZnO or ITZO.

An encapsulation layer TFE may be provided over the common electrode CD. The encapsulation layer TFE may be provided as a single layer, or may be provided as a multi-layer. In an embodiment, the encapsulation layer TFE may have a stacked structure in which an inorganic material, an organic material, and an inorganic material are sequentially deposited. An uppermost layer of the encapsulation layer TFE may include an inorganic material.

As described above, the gate line TGL may overlap the 1ith scan line S1*i*, and be connected to the 1ith scan line S1*i*. Signal lines for individually controlling the eleventh transistor T11 and the twelfth transistor T12 may be excluded because the second transistor T2, the eleventh transistor T11, and the twelfth transistor T12 share the 1ith scan line S1*i* with one another. Thus, the area of the pixel circuit PXC and the sensor circuit SC can be decreased, and resolution can be improved.

Figure 14:
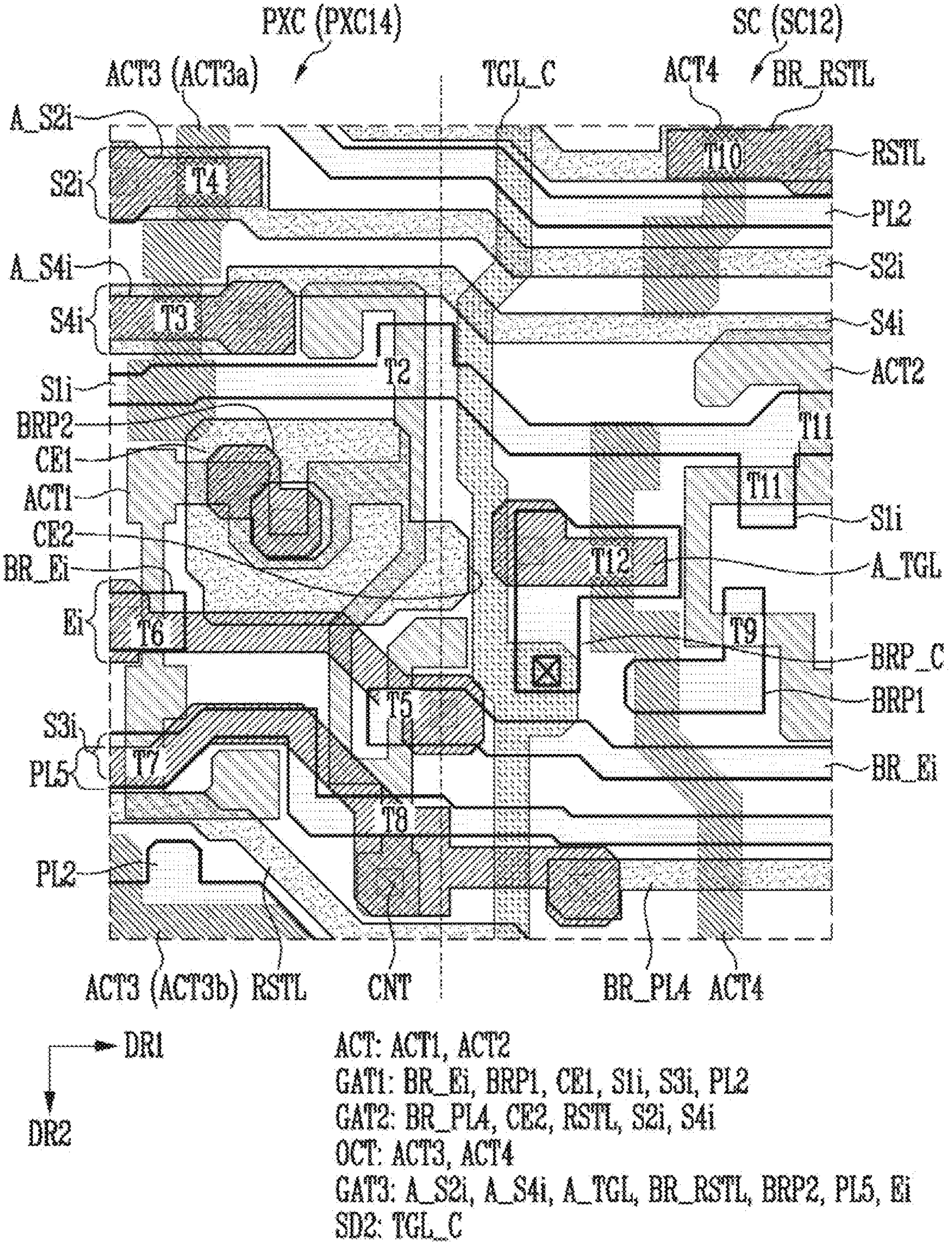
FIG. 14 is a plan view illustrating an embodiment of the display area shown in FIG. 4.
Figure 15:
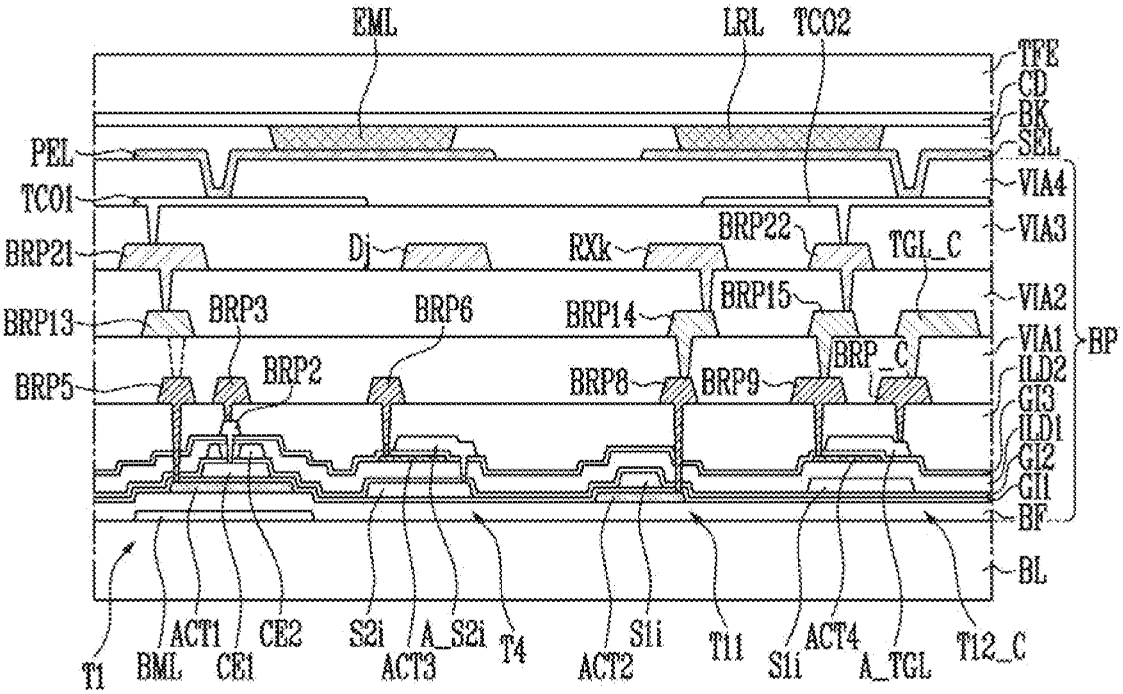
FIG. 15 is a cross-sectional view illustrating an embodiment of the display area shown in FIG. 4.

FIG. 14 is a plan view illustrating an embodiment of the display area shown in FIG. 4. FIG. 15 is a cross-sectional view illustrating an embodiment of the display area shown in FIG. 4.

Referring to FIGS. 11 to 15, an embodiment shown in FIGS. 14 and 15 may be substantially identical or similar to an embodiment shown in FIGS. 11 to 13, except with regard to a gate line TGL_C and a bridge pattern BRP_C. Therefore, for convenience of explanation, a further description of components and technical aspects previously described will be omitted.

A gate patten A_TGL (or gate electrode) may be included in the third conductive layer GAT3, and be disposed on the third gate insulating layer GI3. The gate pattern A_TGL may overlap the fourth semiconductor pattern ACT4, and constitute a gate electrode of a twelfth transistor T12_C.

The bridge pattern BRP_C may be included in the fourth conductive layer SD1, and be disposed on the first via layer VIA1. The bridge pattern BRP_C may be connected to the gate pattern A_TGL through a contact hole.

The gate line TGL_C may be included in the firth conductive layer SD2, and may be disposed on the second via layer VIA2. The gate line TGL_C may substantially extend in the second direction DR2. In an embodiment, the gate line TGL_C does not overlap the pixel circuit PXC. The gate line TGL_C may be connected to the gate pattern A_TGL through a contact hole and the bridge pattern BRP_C.

The gate line TGL_C may extend in the second direction DR2 to avoid coupling with a component of the pixel circuit PXC, but the area of the sensor circuit SC may be increased in the first direction DR1 to accommodate the gate line TGL_C. In addition, coupling between the gate line TGL_C and the component may occur while the gate line TGL_C overlaps a component (e.g., the 4bth power line PL4*b*) of the fourth conductive layer SD1 and the sixth conductive layer SD3, and a load (e.g., a capacitance) of the gate line TGL_C (and the component) may be increased.

Thus, as described with reference to FIGS. 11 to 13, the twelfth transistor T12 uses the 1ith scan line S1*i*, and accordingly, the area of the sensor circuit SC is decreased. As a result, resolution can be improved.

For example, as described with reference to FIGS. 11 to 13, according to embodiments of the present disclosure, the twelfth transistor T12 may be controlled by the 1ith scan line S1*i*, which may enable a more efficient circuit layout. By utilizing the 1ith scan line S1*i*, the sensor circuit SC can be designed with a reduced area, improving the use of available space within the display device. As a result, more sensing elements can be accommodated within a given region, leading to an increase in resolution and an overall improvement in fingerprint sensing accuracy.

Figure 16:
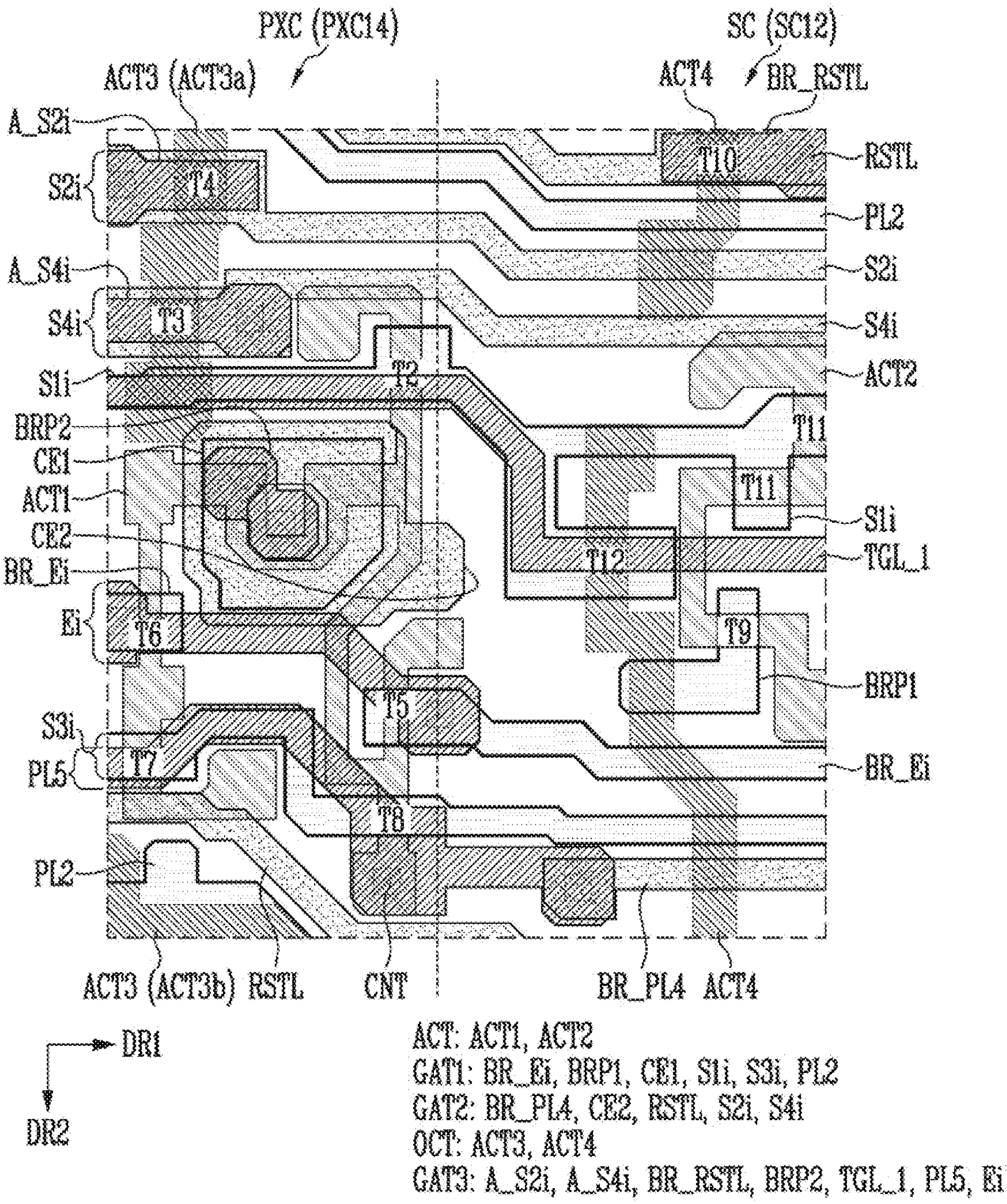
FIG. 16 is a plan view illustrating an embodiment of the display area shown in FIG. 4.

FIG. 16 is a plan view illustrating an embodiment of the display area shown in FIG. 4.

Referring to FIGS. 11 to 13 and 16, an embodiment shown in FIG. 16 may be substantially identical or similar to an embodiment shown in FIGS. 11 to 13, except a gate line TGL_1. Therefore, for convenience of explanation, a further description of components and technical aspects previously described will be omitted.

The gate line TGL_1 may be included in the third conductive layer GAT3, and be disposed on the third gate insulating layer GI3. The gate line TGL_1 may overlap the fourth semiconductor pattern ACT4, and constitute the gate electrode of the twelfth transistor T12. In an embodiment, the gate line TGL_1 is not connected to the 1ith scan line S1*i*. However, the disclosure is not limited thereto.

The gate line TGL_1 may substantially extend in the first direction DR1. The gate line TGL_1 may extend while crossing the pixel circuit PXC (or the pixel).

In an embodiment, the gate line TGL_1 may overlap the 1ith scan line S1*i*. As shown in FIG. 16, the gate line TGL_1 may partially overlap the 1ith scan line S1*i*. A partial section of the gate line TGL_1 may completely overlap the 1ith scan line S1*i*. However, the disclosure is not limited thereto. For example, in an embodiment, the gate line TGL_1 may be disposed to completely overlap the 1ith scan line S1*i*.

In a case in which the gate line TGL_1 overlaps a lower component (e.g., the 1ith scan line S1*i*), coupling may occur, causing a gate signal TG applied to the gate line TGL_1 to influence the lower component. To mitigate this effect, the gate line TGL_1 may be disposed in a manner that avoids overlapping the lower component. However, this placement may increase the area of the pixel circuit PXC and the sensor circuit SC, which may result in a decrease in resolution.

However, as described with reference to FIG. 7, according to embodiments of the present disclosure, the gate signal TG of the gate line TGL_1 and the first scan signal GW[i] of the 1ith scan line S1*i* have a same waveform and a same phase. As a result, even if the gate line TGL_1 and the 1ith scan line S1*i* overlap each other, substantial interference does not occur between them.

A display device according to an embodiment of the present disclosure is applicable to various types of electronic devices. In an embodiment, an electronic device includes the above-described display device and may further include other modules or devices having additional functions in addition to the display device.

Figure 17:
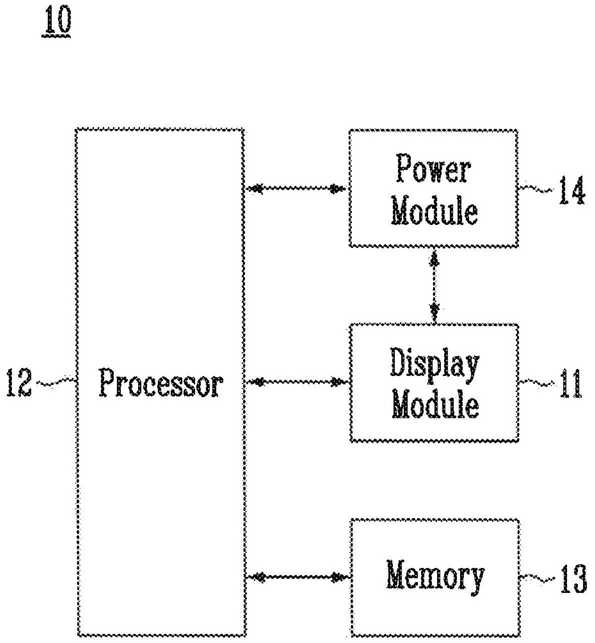
FIG. 17 is a block diagram of an electronic device according to an embodiment of the present disclosure.

FIG. 17 is a block diagram of an electronic device according to an embodiment of the present disclosure. Referring to FIG. 17, the electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and a controller.

The memory 13 may store data and/or information used to operate the processor 12 or the display module 11. When the processor 12 executes an application stored in the memory 13, image data signals and/or input control signals may be transferred to the display module 11. The display module 11 may process the provided signals and output image information on a display screen.

The power module 14 may include a power supply module, such as, for example, a power adapter or a battery device, and a power conversion module. The power conversion module converts power supplied by the power supply module and generates power to operate the electronic device 10.

At least one of the above-described components of the electronic device 10 may be included in the display device according to embodiments as described above. In addition, in terms of functionality, some of the individual modules included in one module may be included in the display device and others may be provided separately from the display device. For example, in an embodiment, the display module 11 is included in the display device, whereas the processor 12, the memory 13, and the power module 14 are not included in the display device and are instead provided separately in the electronic device 10.

Figure 18:
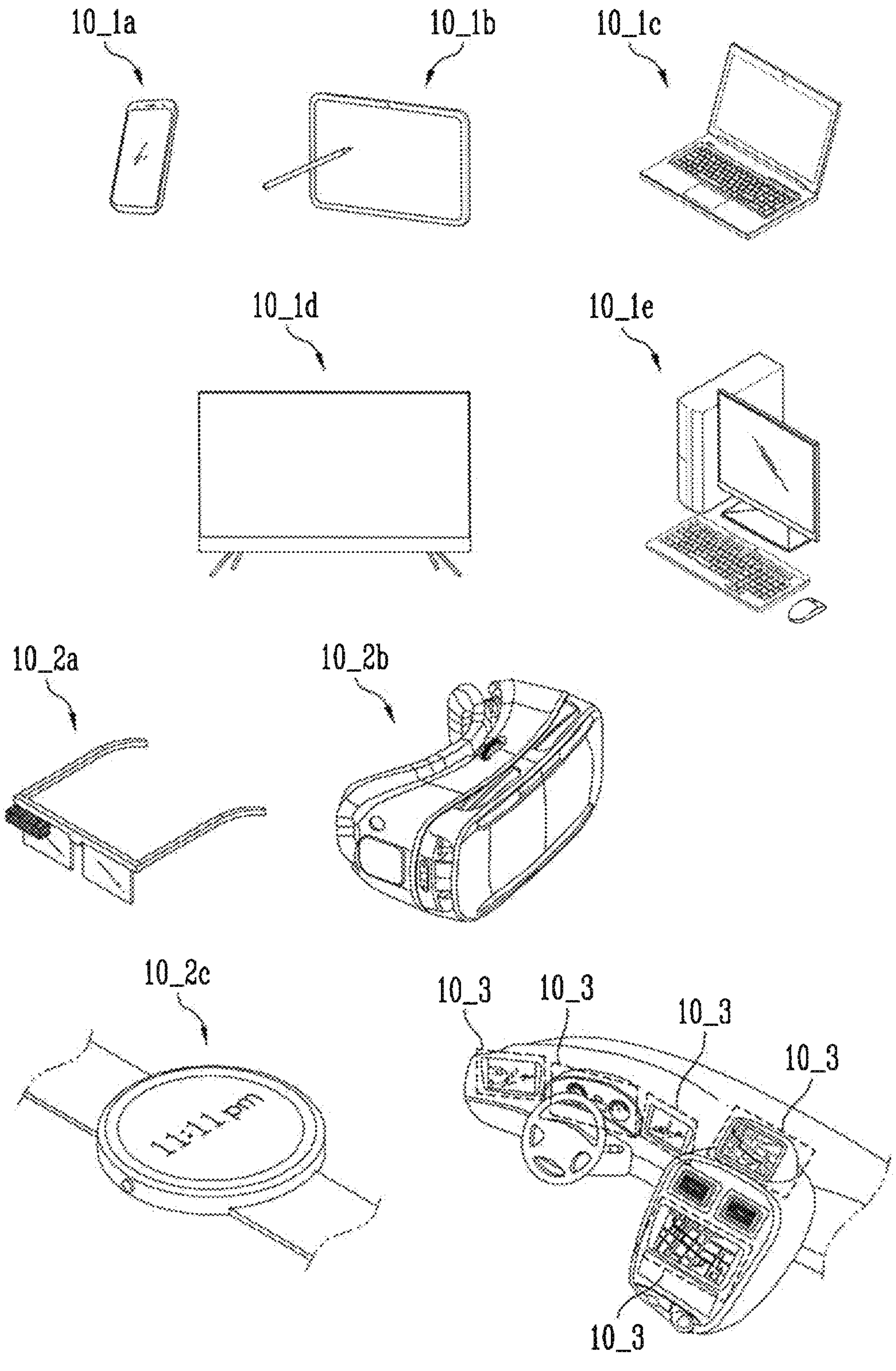
FIG. 18 shows schematic views of various embodiments of an electronic device according to the present disclosure.

FIG. 18 shows schematic views of various embodiments of an electronic device according to the present disclosure.

Referring to FIG. 18, various types of electronic devices to which embodiments of a display device are applied may include an electronic device that displays images such as, for example, a smartphone 10_1*a*, a tablet PC 10_1*b*, a laptop computer 10_1*c*, a television (TV) 10_1*d*, and a desktop monitor 10_1*e*, a wearable electronic device including a display module such as smart glasses 10_2*a*, a head-mounted display (HMD) 10_2*b*, and a smart watch 10_2*c*, and an automotive electronic device 10_3 including a display module such as a center information display (CID) disposed at the instrument cluster, the center fascia, and the dashboard of a vehicle, and a room mirror display.

In the display device and the electronic device according to embodiments of the present disclosure, a third sensor transistor and a fourth sensor transistor of a sensor (and a second transistor of a pixel) may share a first scan line. Thus, signals for individually controlling the third sensor transistor and the fourth sensor transistor can be excluded, the area of the pixel and the sensor can be decreased, and resolution can be improved.

For example, in the display device and electronic device according to embodiments of the present disclosure, the third sensor transistor and the fourth sensor transistor of a sensor, along with the second transistor of a pixel, may be designed to share a common first scan line. By integrating these components under a single scan line, the need for separate control signals for individually operating the third and fourth sensor transistors can be eliminated. As a result, the circuit design may be simplified, reducing the number of required signal lines and decreasing the overall area occupied by both the pixel and sensor circuits. This improved layout not only enhances space efficiency within the display panel but also contributes to an increase in resolution by allowing a greater number of sensing and display elements to be accommodated within a given area. As a result, a more compact and high-resolution display device with enhanced sensing capabilities may be provided.

In the display device and the electronic device according to embodiments of the present disclosure, noise of the sensor is sensed after resetting, and the noise may be removed from a sensing signal. As a result, the sensing ability of the sensor can be enhanced.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
a pixel including a light-emitting element; and
a sensor,
wherein the sensor includes:
a light-receiving element;
a first sensor transistor;
a second sensor transistor connected between a reset power line and a gate electrode of the first sensor transistor,
wherein the second sensor transistor includes a gate electrode connected to a reset control line;
a third sensor transistor connected between the first sensor transistor and a readout line,
wherein the third sensor transistor includes a gate electrode connected to a first scan line; and
a fourth sensor transistor connected between the gate electrode of the first sensor transistor and an anode electrode of the light-receiving element,
wherein the fourth sensor transistor includes a gate electrode connected to a gate line,
wherein the first scan line and the gate line are connected to each other.

2. The display device of claim 1, wherein the third sensor transistor is a p-type transistor, and the fourth sensor transistor is an n-type transistor.

3. The display device of claim 2, wherein the third sensor transistor includes a silicon semiconductor, and the fourth sensor transistor includes an oxide semiconductor.

4. The display device of claim 2, wherein the first sensor transistor is a p-type transistor, and the second sensor transistor is an n-type transistor.

5. The display device of claim 1, wherein the pixel further includes:
a first transistor that provides a driving current to the light-emitting element; and
a second transistor connected between a first electrode of the first transistor and a data line,
wherein a gate electrode of the second transistor is connected to the first scan line.

6. The display device of claim 1, further comprising:
a driving circuit,
wherein the driving circuit:
provides a reset signal having a logic high level to the reset control line at a first time point;

provides a first scan signal having a logic low level to the first scan line and the gate line at a second time point;

provides a gate signal to the first scan line and the gate line at a third time point, wherein the gate signal has the logic high level at the third time point; and provides the gate signal to the first scan line and the gate line at a fourth time point, wherein the gate signal has the logic low level at the fourth time point, wherein the first to fourth time points sequentially occur in a sensing cycle.

7. The display device of claim 6, wherein the driving circuit reads a first sensing signal through the readout line at the second time point, reads a second sensing signal through the readout line at the fourth time point, and performs a subtraction operation on the first sensing signal and the second sensing signal.

8. The display device of claim 6, further comprising:

a plurality of sensors including the sensor, wherein the driving circuit commonly provides the reset signal to the plurality of sensors, and sequentially provides the first scan signal to the plurality of sensors in units of horizontal lines.

9. The display device of claim 8, wherein exposure times for the respective plurality of sensors between the third time point and the fourth time point are constant.

10. The display device of claim 1, wherein, in a plan view, a semiconductor layer of the second sensor transistor and a semiconductor layer of the fourth sensor transistor substantially extend in a second direction, wherein, in the plan view, the first scan line and the gate line substantially extend in a first direction crossing the second direction.

11. The display device of claim 10, wherein, in the plan view, the first scan line includes a protruding portion that overlaps the semiconductor layer of the fourth sensor transistor, wherein, in the plan view, the gate line overlaps the protruding portion of the first scan line.

12. The display device of claim 10, wherein, in a cross-sectional view, the semiconductor layer of the fourth sensor transistor is disposed between the first scan line and the gate line, wherein, in the cross-sectional view, the gate line is in contact with the first scan line through a contact hole.

13. A display device, comprising:

a pixel including a light-emitting element; and a sensor, wherein the sensor includes:

a light-receiving element;

a first sensor transistor;

a second sensor transistor connected between a reset power line and a gate electrode of the first sensor transistor, wherein the second sensor transistor includes a gate electrode connected to a reset control line;

a third sensor transistor connected between the first sensor transistor and a readout line, wherein the third sensor transistor includes a gate electrode connected to a first scan line; and a fourth sensor transistor connected between the gate electrode of the first sensor transistor and an anode electrode of the light-receiving element, wherein the fourth sensor transistor includes a gate electrode connected to a gate line, wherein a first scan signal provided to the first scan line and a gate signal provided to the gate line have a same waveform.

14. The display device of claim 13, wherein the third sensor transistor is a p-type transistor, and the fourth sensor transistor is an n-type transistor.

15. The display device of claim 14, wherein the third sensor transistor includes a silicon semiconductor, and the fourth sensor transistor includes an oxide semiconductor.

16. The display device of claim 13, wherein the pixel further includes:

a first transistor that provides a driving current to the light-emitting element; and a second transistor connected between a first electrode of the first transistor and a data line, and wherein a gate electrode of the second transistor is connected to the first scan line.

17. The display device of claim 13, further comprising:

a driving circuit, wherein the driving circuit:

provides a reset signal having a logic high level to the reset control line at a first time point;

provides the first scan signal to the first scan line and the gate line at a second time point, wherein the first scan signal has a logic low level at the second time point;

provides the gate signal to the first scan line and the gate line at a third time point, wherein the gate signal has the logic high level at the third time point; and provides the gate signal to the first scan line and the gate line at a fourth time point, wherein the gate signal has the logic low level at the fourth time point, wherein the first to fourth time points sequentially occur in a sensing cycle.

18. The display device of claim 13, wherein, in a plan view, a semiconductor layer of the second sensor transistor and a semiconductor layer of the fourth sensor transistor extend in a second direction, wherein, in the plan view, the first scan line and the gate line extend while crossing the pixel in a first direction crossing the second direction.

19. The display device of claim 18, wherein, in the plan view, the gate line overlaps the first scan line.

20. An electronic device, comprising:

a display device configured to display an image, based on input image data; and a processor configured to provide the input image data to the display device, wherein the display device includes:

a pixel including a light-emitting element; and a sensor, wherein the sensor includes:

a light-receiving element;

a first sensor transistor;

a second sensor transistor connected between a reset power line and a gate electrode of the first sensor transistor, wherein the second sensor transistor includes a gate electrode connected to a reset control line;

a third sensor transistor connected between the first sensor transistor and a readout line, wherein the third sensor transistor includes a gate electrode connected to a first scan line; and a fourth sensor transistor connected between the gate electrode of the first sensor transistor and an anode electrode of the light-receiving element, wherein the fourth sensor transistor includes a gate electrode connected to a gate line, wherein the first scan line and the gate line are connected to each other.

* * * * *